US008775891B2

(12) United States Patent
Ichimiya et al.

(10) Patent No.: US 8,775,891 B2
(45) Date of Patent: Jul. 8, 2014

(54) TRANSMISSION DEVICE, RECEIVING CIRCUIT AND CONTROL METHOD OF TRANSMISSION DEVICE

(75) Inventors: Junji Ichimiya, Kawasaki (JP); Hiroshi Nakayama, Kawasaki (JP); Daisuke Itou, Kawasaki (JP); Shintaro Itozawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 868 days.

(21) Appl. No.: 12/763,551

(22) Filed: Apr. 20, 2010

(65) Prior Publication Data

US 2010/0275084 A1 Oct. 28, 2010

(30) Foreign Application Priority Data

Apr. 27, 2009 (JP) ................................ 2009-107236

(51) Int. Cl.
*H04L 1/18* (2006.01)

(52) U.S. Cl.
USPC .......................................... 714/749; 714/774

(58) Field of Classification Search
USPC ................................................. 714/774, 749
See application file for complete search history.

(56) References Cited

U.S. PATENT DOCUMENTS 6,981,189 B2 12/2005 Yanagihara
7,215,128 B2 5/2007 Fujisawa
2005/0185449 A1 8/2005 Shiota et al.
2008/0279305 A1* 11/2008 Matsumoto et al. .......... 375/295
2009/0034488 A1* 2/2009 Takagi .......................... 370/335
2009/0249154 A1* 10/2009 Sasaki ........................... 714/748

FOREIGN PATENT DOCUMENTS

JP 3-80741 4/1991
JP 2001-175373 6/2001
JP 2003-122465 4/2003
JP 2005-234976 9/2005
JP 2006-203405 8/2006

OTHER PUBLICATIONS

Japanese Office Action mailed Jul. 9, 2013 in corresponding Japanese Application No. 2009-107236.

* cited by examiner

*Primary Examiner* — M. Mujtaba K Chaudry
(74) *Attorney, Agent, or Firm* — Staas & Halsey LLP

(57) ABSTRACT

A transmitting circuit transmits data to which an error detection code is attached to a receiving circuit via a transmission path. When detecting the error of the data received via the transmission path, a receiving circuit transmits a retransmit request for the data in which the error is detected to the transmitting circuit. The receiving circuit enters a termination unit adjustment period using the error detection of the received data as a trigger and updates the resistance values of a receiving side termination unit installed at the termination of the transmission path to an appropriate value within the termination unit adjustment period.

10 Claims, 16 Drawing Sheets

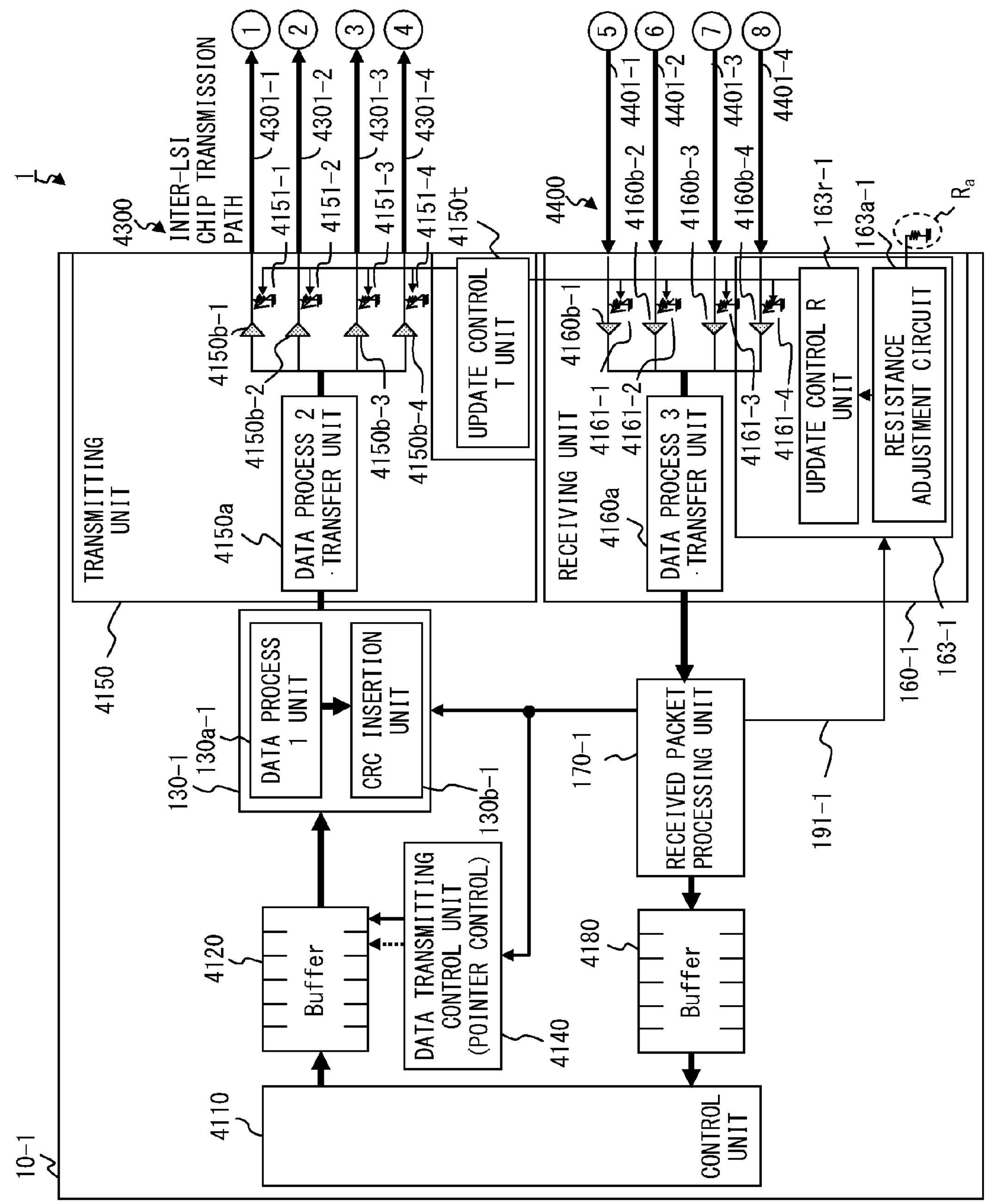
F I G. 1 A

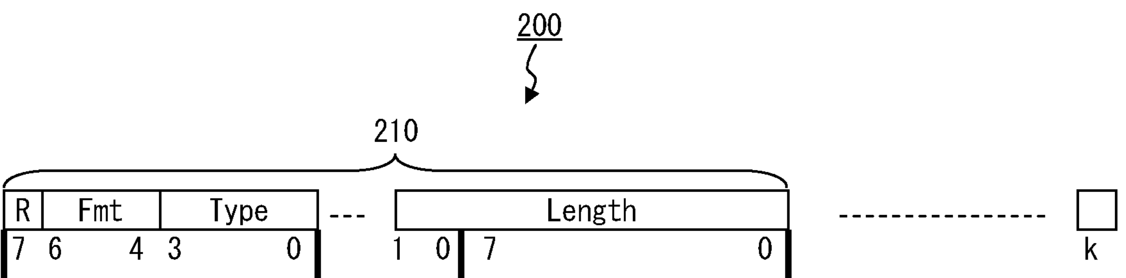
F I G. 3A
| N | CONTENTS OF REQUEST | FMT | TYPE |
|---|---|---|---|
| 1 | TERMINATION RESISTANCE ADJUST REQUEST ISSUE REQUEST PACKET | 3’b111 | 4’b1000 |
| 2 | TERMINATION RESISTANCE ADJUST REQUEST | 3’b111 | 4’b1001 |
| 3 | OPERATION RETURN REQUEST | 3’b111 | 4’b1010 |
| 4 | TERMINATION RESISTANCE VALUE UPDATE COMPLETE PACKET | 3’b111 | 4’b1011 |
| 5 | NON-OPERATION PACKET (INVALID) | 3’b111 | 4’b1100 |
F I G. 3B

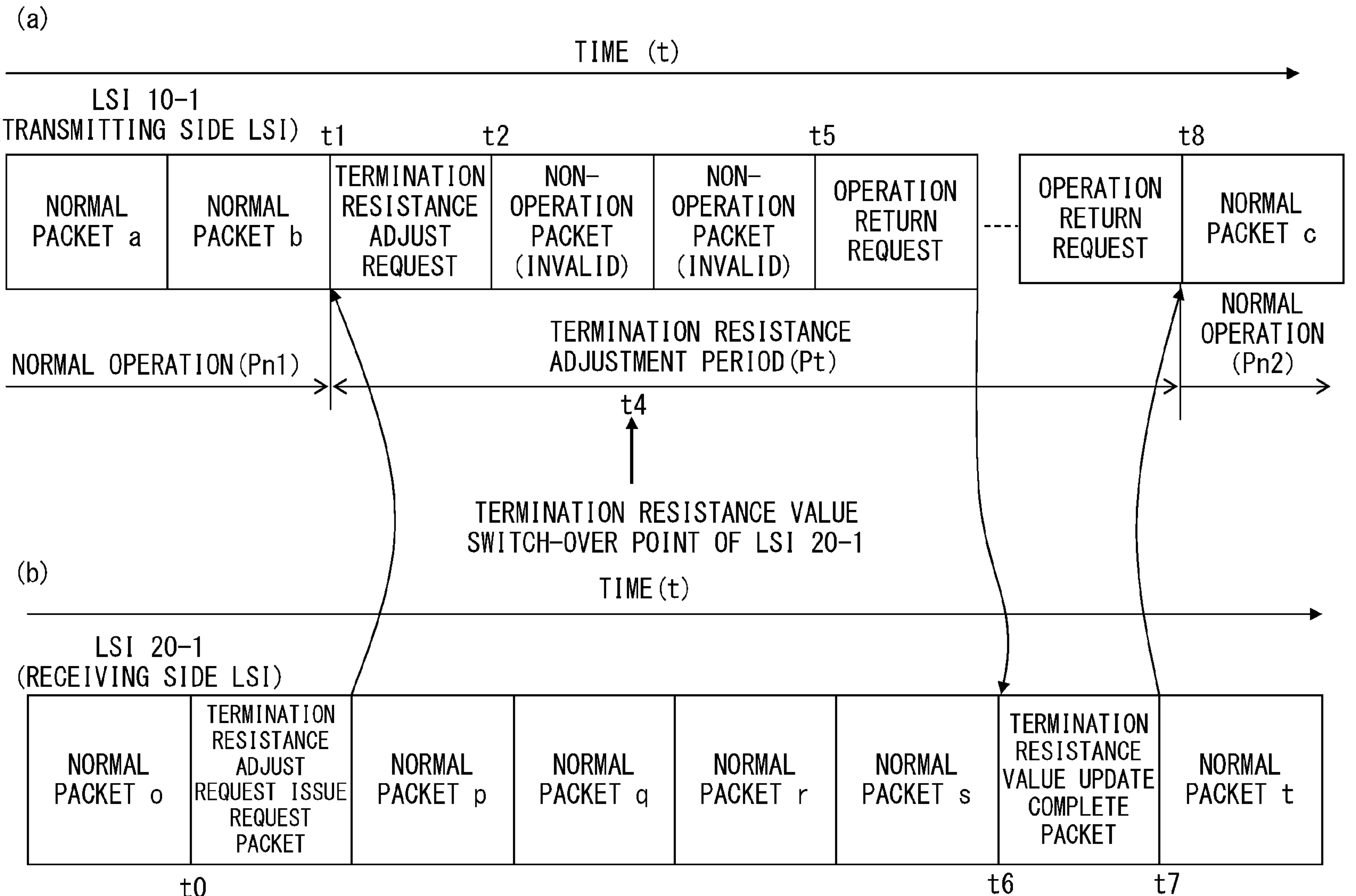
F I G. 4

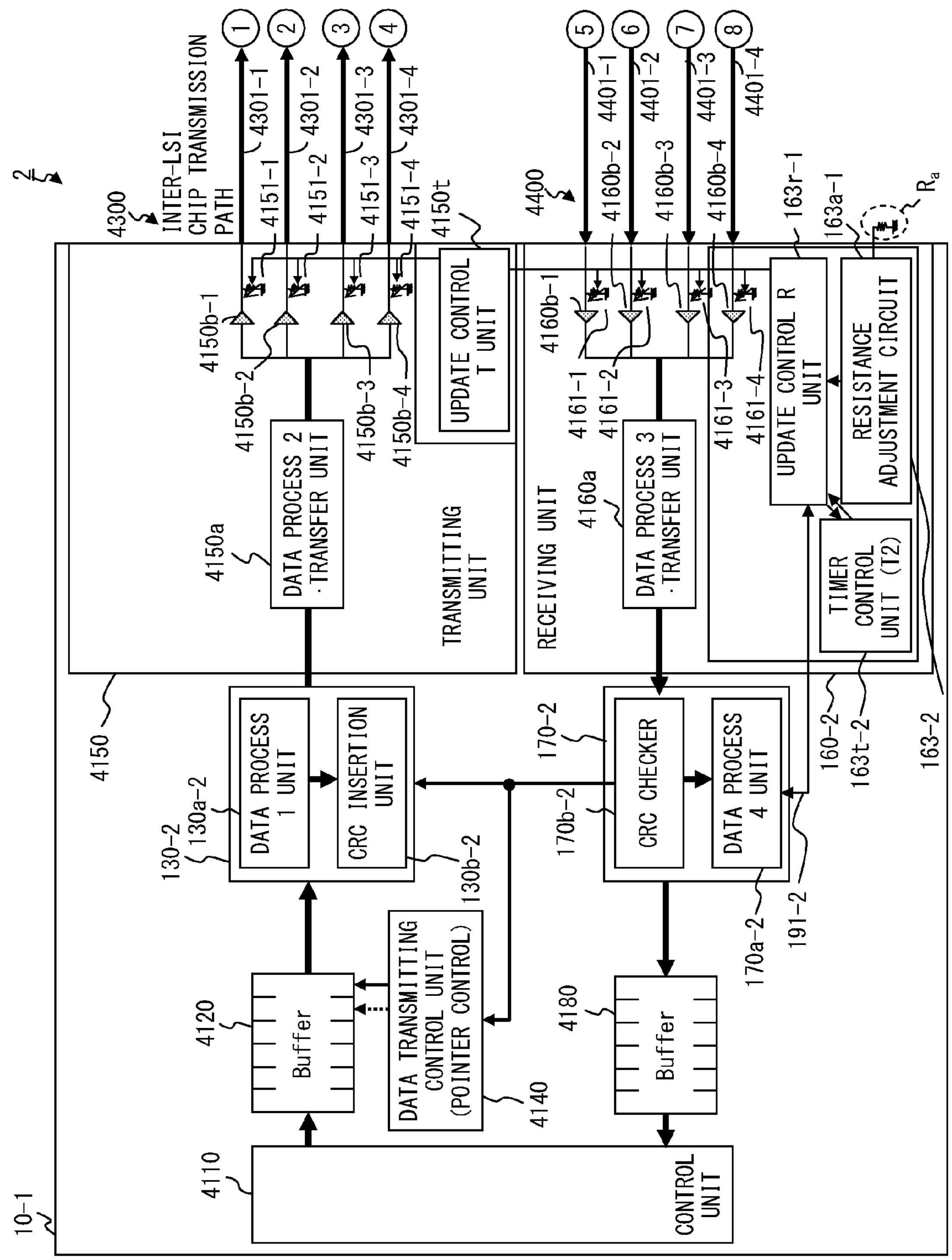
F I G. 6A

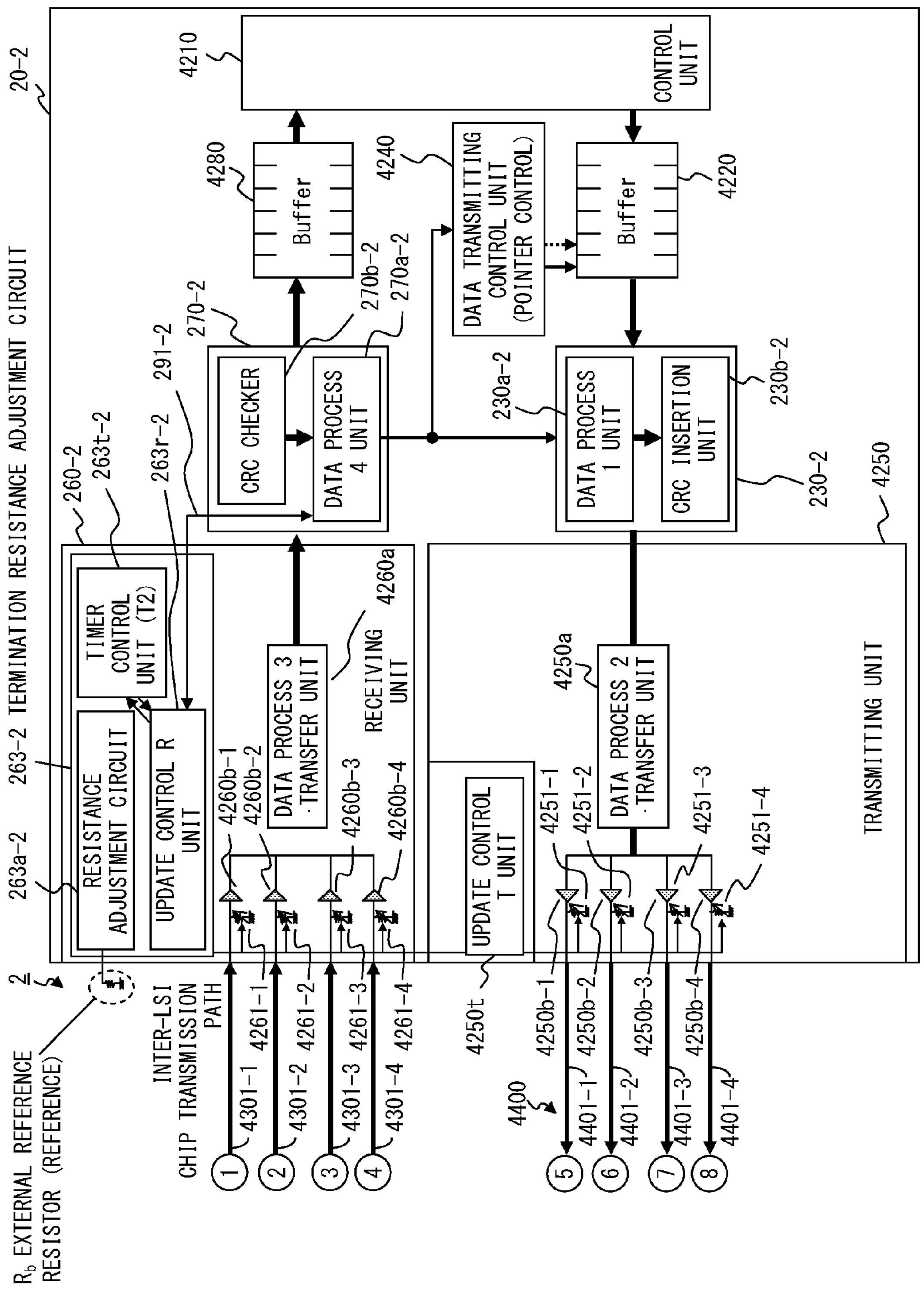
F I G. 6B

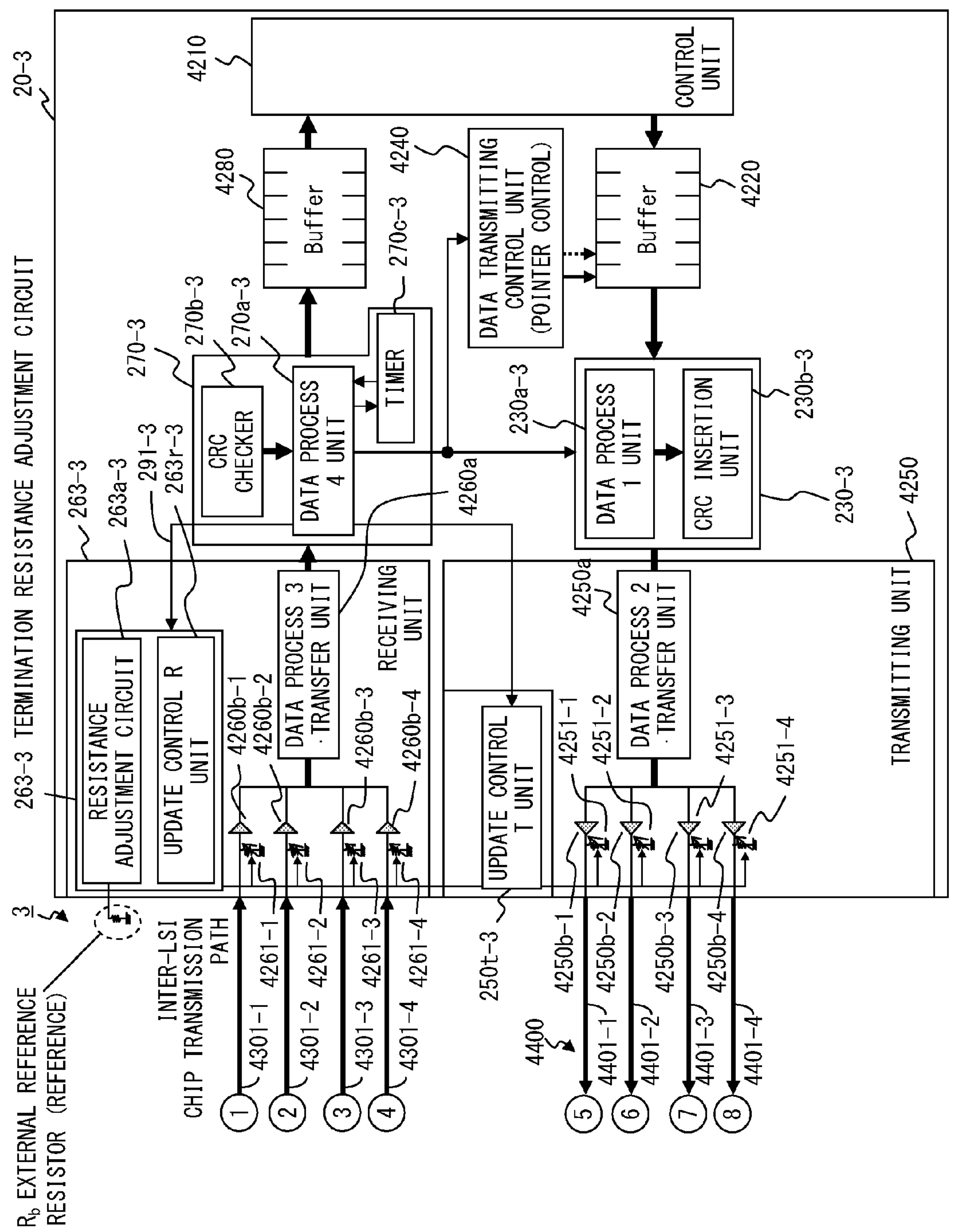
F I G. 8B

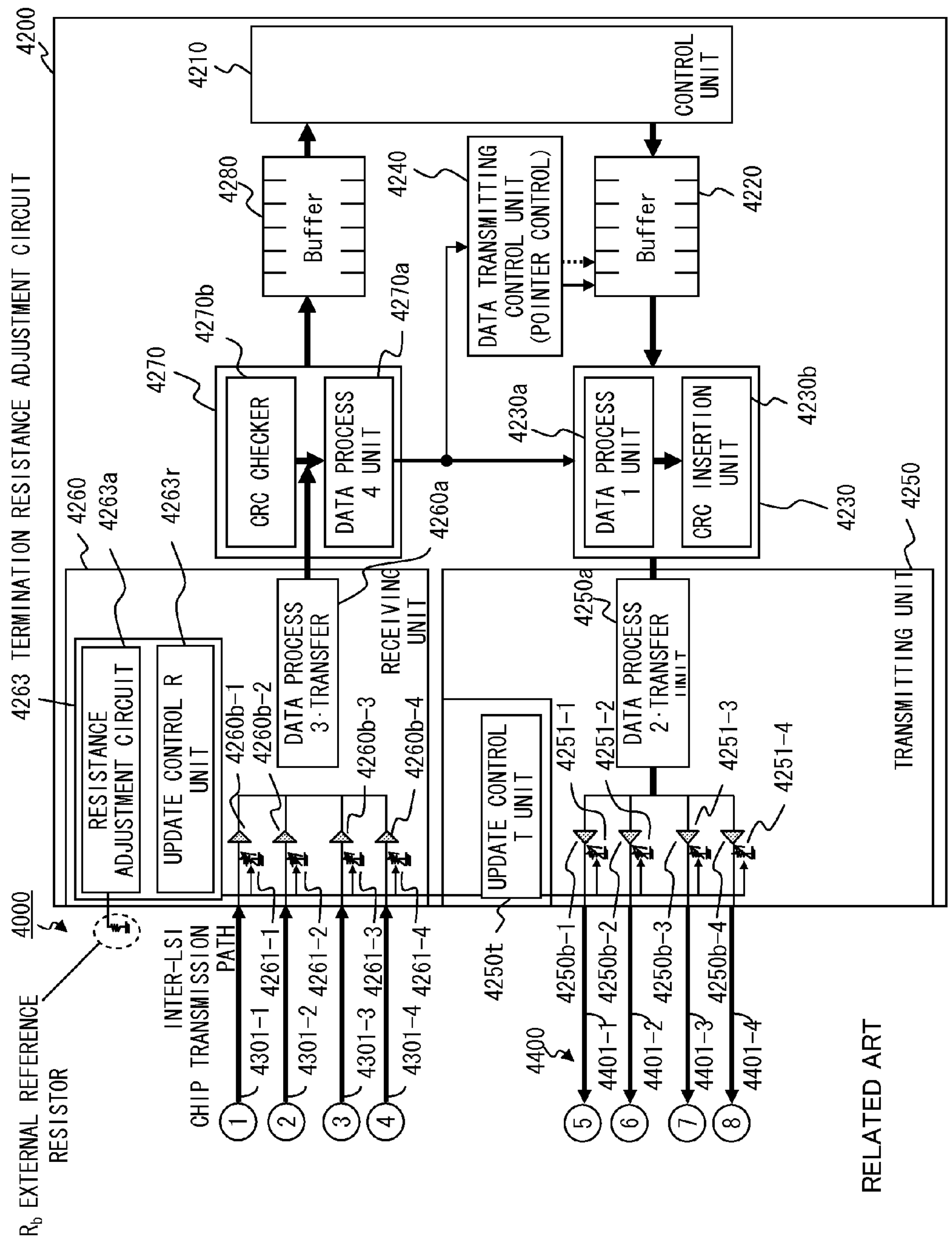
F I G. 1 2 B

TRANSMISSION DEVICE, RECEIVING CIRCUIT AND CONTROL METHOD OF TRANSMISSION DEVICE

CROSS-REFERENCE TO RELATED APPLICATIONS

This application is based upon and claims the benefit of priority of the prior Japanese Patent Application No. 2009-107236, filed on Apr. 27, 2009, the entire contents of which are incorporated herein by reference.

FIELD

The embodiments discussed herein are related to a transmission device, a receiving circuit and control method of transmission device.

BACKGROUND

Recently, the need for a high transfer speed between LSIs (large Scale Integrated circuits) has increased more and more along with improvements in the performance of semi-conductor devices such as CPUs (Central Processing Units), chip sets, and the like. Naturally, a high transfer speed between LSIs greatly affects the performance of a computer system on which the LSIs are mounted.

In high-speed transmission between LSIs, each design element affecting a signal waveform transmitted between LSIs requires high design accuracy in order to transmit a signal with no error. Furthermore, in high-speed transmission, since the amplitude of a waveform is small, a design margin is small.

One of the design elements of high-speed transmission between LSIs is a termination resistor. This termination resistor is installed at both ends of a transmission path (transmission line) between LSIs. A termination resistor plays a role of improving the electrical characteristic of a transmission path by preventing the reflection of a transmission signal at both ends of the transmission path and preventing the waveform of a transmission signal from being disturbed. The disturbed waveform of a transmission signal deteriorates the high-speed transfer of a signal in high-speed transmission. It is necessary to keep the resistance value of a termination resistor constant as much as possible in such a way as to meet the regulations of a transmission path.

Recently, the negative influences on a transmission path of changes in the resistance value of a termination resistor have been tending to get greater and greater due to the low power consumption of an LSI (reduction of power voltage), the effects of high-speed transmission, improvement in chip integration, and the like. Therefore, the adjustment accuracy of a termination resistor has become an important factor for realizing high-speed transmission between LSIs.

FIG. 11 is a basic configuration of a transmission device for transmitting/receiving data between LSIs.

The transmission device 900 illustrated in FIG. 11 includes an LSI 1000 (LSIa), an LSI 2000 (LSIb), and transmission paths 3001 and 3002 between those LSIs. The LSIs 1000 and 2000 exchange data with each other via the transmission paths 3001 and 3002.

The LSI 1000 includes an output driver (transmitting driver) 1001, a receiver 1002, signal wires 1011 and 1012, and termination resistors 1021 and 1022. The signal wire 1011 connects between the transmitting driver 1001 and the transmission path 3001. The termination resistor 1021 is connected between the signal wire 1011 and the ground. The signal wire 1012 connects between the receiver 1002 and the transmission path 3002. The termination resistor 1022 is connected between the signal wire 1012 and the ground.

The LSI 2000 has the same configuration as the LSI 1000. The LSI 2000 includes a transmitting driver (output driver) 2001, a receiver 2002, signal wires 2011 and 2012, and termination resistors 2021 and 2022. The signal wire 2012 connects between the receiver 2002 and the transmission path 3001. The termination resistor 2022 is connected between the signal wire 2012 and the ground. The signal wire 2011 connects between the transmitting driver 2001 and the transmission path 3002. The termination resistor 2021 is connected between the signal wire 2011 and the ground.

In a transmission device 900 having the above configuration the characteristic impedance of the termination resistors 1021 and 2022 is adjusted in such a way as to meet the regulation value of a transmission path, taking into account the characteristic impedance of the transmission path 3001, and to match their impedance. Similarly, the characteristic impedance of the termination resistors 1022 and 2021 is adjusted in such a way as to meet the regulation value of a transmission path and to realize good high-speed transmission.

A technique for controlling so as to match termination resistance with the characteristic impedance of a transmission path as in the above transmission device 900 is disclosed by, for example, Japanese Laid-open Patent Publication Nos. 2003-122465 and 2001-175373 and the like.

FIGS. 12A and 12B are an example of the general configuration of a conventional inter-LSI transmission device.

The inter-LSI transmission device 4000 illustrated in FIGS. 12A and 12B includes two LSIs 4100 (LSIA) and 4200 (LSIB), and transmission paths (inter-LSI chip transmission paths) 4300 and 4400 connecting between those two LSIs 4100 and 4200. The LSIs 4100 and 4200 are connected by the two transmission paths 4300 and 4400. The transmission path 4300 is used for the LSI 4100 to transmit data to the LSI 4200 and the transmission path 4400 is used for the LSI 4200 to transmit data to the LSI 4100. The transmission path 4300 is composed of four signal wires 4301-1 through 4301-4 and the transmission path 4400 is composed of four signal wires 4401-1 through 4401-4.

The respective interface units of the LSIs 4100 and 4200 have the same circuit configuration. The interface unit of the LSI 4100 is the circuit of the LSI 4100, excluding a control unit 4110. The interface unit of the LSI 4200 is the circuit of the LSI 4200, excluding a control unit 4210.

Therefore, the circuit configuration of the LSI 4100 is mainly explained here and the explanation of the LSI 4200 is omitted.

The LSI 4100 includes a control unit 4110, a transmitting buffer 4120, a transmitting packet processing unit 4130, a data transmitting control unit 4140, a transmitting unit 4150, a receiving unit 4160, a received packet processing unit 4170, and a receiving buffer 4180.

The control unit 4110 generates/controls a packet transmitted to/received from a communication partner LSI and so on.

A packet generated/controlled by the control unit 4110 is, for example, a packet controlled by a transaction layer or the like. The control unit 4110 controls a packet to be transmitted to a communication partner LSI (transmitting packet) and stores the transmitting packet in the transmitting buffer 4120. The control unit 4110 extracts a packet received from a communication partner LSI (received packet), and so on from the receiving buffer 4180.

The transmitting buffer 4120 stores a transmitting packet from the control unit 4110. The position of the transmitting packet stored in the transmitting buffer 4120 (storage position) is structured to be controlled by a pointer controlled by the data transmitting control unit 4140.

The transmitting packet processing unit 4130 includes a transmitting data processing 1 unit 4130*a* and a CRC insertion unit 4130*b*. The transmitting data processing 1 unit 4130*a* extracts a transmitting packet from the transmitting buffer 4120 and outputs the packet to the CRC insertion unit 4130*b*. The CRC insertion unit 4130*b* generates the CRC code (cyclic redundancy check code) of the transmitting packet and inserts the CRC code into the transmitting packet. Then, the transmitting packet processing unit 4130 outputs the transmitting packet in which the CRC code is inserted to the transmitting unit 4150.

The transmitting unit 4150 includes a data processing 2· transfer unit 4150*a*, four transmitting drivers 4150*b*-1 through 4150*b*-4, termination resistors 4151-1 through 4151-4 connected between signal wires 4301-1 through 4301-4 connected to the output terminal of the transmitting driver and the ground, and a transmitting side termination resistor update control T unit 4150*t*. The data processing 2· transfer unit 4150*a* divides a transmitting packet received from the transmitting data processing unit 4130 into four pieces of data and outputs each piece of the data to each of the four transmitting drivers 4150*b*-1 through 4150*b*-4. Each of the transmitting drivers 4150*b*-1 through 4150*b*-4 outputs the data input from the data processing 2· transfer unit 4150*a* to each of the signal wires 4301-1 through 4301-4. The transmitting side termination resistor update control T unit 4150*t* is connected to a termination resistance adjustment circuit 4163, which will be described later. The transmitting side termination resistor update control T unit 4150*t* updates the resistance values of the termination resistors 4151-1 through 4151-4 to appropriate values on the basis of a control signal input from the termination resistance adjustment circuit 4163. These appropriate values are set by the resistance value of an external reference resistor Ra, which depends on an environmental change and is difficult to change.

The receiving unit 4160 includes a data processing 3· transfer unit 4160*a*, four receivers 4160*b*-1 through 4160*b*-4, termination resistors 4161-1 through 4161-4 connected between signal wires 4401-1 through 4401-4 connected to the input terminal of the receiver 4160*b*-1 through 4160*b*-4 and the ground, and a termination resistance adjustment circuit 4163. The data processing 3· transfer unit 4160*a* combines the four pieces of data input from each of the four receivers 4160*b*-1 through 4160*b*-4 to reproduce a packet and outputs the packet to the received packet processing unit 4170. The termination resistance adjustment circuit 4163 includes a resistance adjustment circuit 4163*a* and a receiving side update control unit 4163*r*. A reference resistor (external reference resistor) Ra externally installed in the LSI 4100 is connected to the termination resistance adjustment circuit 4163. The termination resistance adjustment circuit 4163*a* and the external reference resistor Ra are connected by the terminal (pin) of the LSI 4100 and the wiring connected to the terminal.

The external reference resistor Ra has a resistance value that becomes the base of the value (resistance value) of the termination resistors 4151-1 through 4151-4 and 4161-1 through 4161-4. By adjusting in such a way that the resistance values of the termination resistors 4151-1 through 4151-4 and 4161-1 through 4161-4 equal the resistance value of the external reference resistor Ra, impedance is adjusted at the terminal end of the transmission paths 4300 and 4400, and signal reflection at the terminal end of the transmission paths 4300 and 4400 is suppressed.

The resistance adjustment circuit 4163*a* of the termination resistance adjustment circuit 4163 generates a control signal for adjusting the resistance values of termination resistors 4151-1 through 4151-4 and 4161-1 through 4161-4, by referring to the resistance value of the external reference resistor Ra. The resistance values of the termination resistors 4151-1 through 4151-4 and 4161-1 through 4161-4 which change due to the influence of the change of ambient temperature, the fluctuation of power voltage, and the like are set to the adjusted resistance value. The receiving side update control T unit 4163*r* updates the resistance values of the termination resistors 4161-1 through 4161-4 in such a way that the resistance values of the termination resistors 4161-1 through 4161-4 equal the resistance value of the external reference resistor Ra on the basis of a control signal input from the resistance adjustment circuit 4163*a*.

The resistance adjustment circuit 4163*a* of the receiving unit 4160 is connected to the transmitting side update control T unit 4150*t* of the transmitting unit 4150. When the power of the LSI 4100 is switched on, the resistance adjustment circuit 4163*a* sets the resistance values of both the termination resistors 4161-1 through 4161-4 of the receiving unit 4160 and the termination resistors 4151-1 through 4151-4 of the transmitting unit 4150 to the resistance value adjusted by referring to the resistance value of the external reference resistor Ra.

The received packet processing unit 4170 includes a received data processing unit 4170*a* and a CRC checker 4170*b*. The CRC checker 4170*b* applies a CRC check to data received from the receiving unit 4160 and notifies the data processing unit 4170*a* of the data of a packet and the like, error information, and the like. When determining from the notice from the CRC checker 4170*b* that the received packet has failed, the data processing unit 4170*a* notifies the transmitting packet processing unit 4130 of the failure of the received packet. The transmitting unit 4150 transmits a request for requesting the retransmission of the failed packet (retransmit request) to the receiving unit 4260 of the LSI 4200 via the transmission path 4300.

When receiving a report that the received packet has not failed from the CRC checker 4170*b*, the data processing unit 4170*a* removes the header of a lower-ordered layer (for example, a data link layer), CRC data or the like from the received packet, generates the received packet of a higher-ordered layer (for example, a transaction layer) and stores the generated received packet in the receiving buffer 4180.

The receiving buffer 4180 stores packets received from the received packet processing unit 4170. The received packets stored in the receiving buffer 4180 are read by the control unit 4110.

The LSI 4200 (LSIB) includes a control unit 4210, a transmitting buffer 4220, a transmitting packet processing unit 4230, a data transmitting control unit 4240, a transmitting unit 4250, a receiving unit 4260, a received packet processing unit 4270 and a receiving buffer 4280. The circuit configuration of the interface unit of the LSI 4200 is the same as that of the above-described LSI 4100 (LSIA). The same descriptions are attached to the same components in the LSI 4200 as those of the LSI 4100. A reference resistor (external reference resistor) Rb is externally installed in the termination resistance adjustment circuit 4263 of the LSI 4200.

The configurations of the termination resistance adjustment circuit 4163 of the LSI 4100 and the termination resistance adjustment circuit 4263 of the LSI 4200 are disclosed by, for example, Japanese Laid-open Patent Publication No. 2006-203405. The resistance adjustment circuits 4163*a* and 4263*a* of the termination resistance adjustment circuits 4163 and 4263 correspond to the calibration circuit disclosed by Japanese Laid-open Patent Publication No. 2006-203405.

The transmitting unit 4150 of the LSI 4100 and the receiving unit 4260 of the LSI 4200 are connected by the transmission path 4300. The transmitting unit 4250 of the LSI 4200 and the receiving unit 4160 of the LSI 4100 are connected by the transmission path 4400. The LSIs 4100 and 4200 can conduct both-way communications by using the transmission paths 4300 and 4400. More specifically, the transmitting drivers 4150*b*-1 through 4150*b*-4 of the transmitting unit 4150 of the LSI 4100 and the receivers 4260*b*-1 through 4260*b*-4 of the LSI 4200 are connected by the signal wires 4301-1 through 4301-4, respectively. The transmitting drivers 4250*b*-1 through 4250*b*-4 of the transmitting unit 4250 of the LSI 4200 and the receivers 4160*b*-1 through 4160*b*-4 of the LSI 4100 are connected by the signal wires 4401-1 through 4401-4, respectively. Therefore, in order for the LSI 4200 to accurately receive data from the LSI 4100, it is desired to adjust the resistance values of the termination resistors 4261-1 through 4261-4 of the receiving unit 4260 of the LSI 4200 to desired resistance values via the resistance value of the external reference resistor Rb. On the other hand, it is desired to adjust the resistance values of the termination resistors 4151-1 through 4151-4 of the transmitting unit 4150 of the LSI 4100 to a desired resistance values via the resistance value of the external reference resistor Ra. Similarly, in order for the LSI 4100 to accurately receive data from the LSI 4200, it is desired to adjust the resistance values of the termination resistors 4161-1 through 4161-4 of the receiving unit 4160 of the LSI 4100 to desired resistance values via the resistance value of the external reference resistor Ra, and the resistance values of the termination resistors 4251-1 through 4251-4 of the transmitting unit 4250 of the LSI 4200 to desired resistance values via the external reference resistor Rb.

The operation in the case where the LSI 4100 transmits data to the LSI 4200 will be briefly explained below. A packet transferred from the control unit 4110 of the LSI 4100 is transferred to the data processing 1 unit 4130*a* of the transmitting packet processing unit 4130 via the transmitting buffer 4120 of the LSI 4100. The CRC insertion unit 4130*b* of the transmitting packet processing unit 4130 generates the CRC code of the packet input to the data processing 1 unit 4130*a*. The transmitting packet processing unit 4130 inserts the CRC code generated by the CRC insertion unit 4130*b* in the packet input by the data processing 1 unit 4130*a* and outputs the packet in which the CRC code is inserted to the transmitting unit 4150. The transmitting unit 4150 transmits the packet received from the transmitting packet processing unit 4130 to the transmission path 4300. The receiving unit 4260 of the LSI 4200 receives the packet transmitted via the transmission path 4300. The receiving unit 4260 transfers the packet transmitted from the LSI 4100 to the data processing 4 unit 4270*a* of the received packet processing unit 4270. The CRC checker 4270*b* of the received packet processing unit 4270 applies a data error check using a CRC to the packet (received packet) that the data processing 4 unit 4270*a* has received from the receiving unit 4260.

The CRC checker 4270*b* notifies the data processing 4 unit 4270*a* of the detection result of the data error of the received packet. If there is no error in the received packet, the data processing 4 unit 4270*a* writes the received packet in the receiving buffer 4280. If there is any error in the received packet, the data processing unit 4270*a* notifies the transmitting packet processing unit 4230 of error information about the packet whose error is received. Upon receipt of the error information from the received packet processing unit 4270, the transmitting packet processing unit 4230 generates a retransmit request and transmits the request to the transmitting unit 4250. The transmitting unit 4250 transmits the retransmit request received from the transmitting packet processing unit 4230 to the transmission path 4400.

The receiving unit 4160 of the LSI 4100 receives the retransmit request transmitted by the LSI 4200 via the transmission path 4400. The receiving unit 4160 transfers the retransmit request received from the LSI 4200 to the received packet processing unit 4170. Upon receipt of the retransmit request from the receiving unit 4160, the received packet processing unit 4170 requests that the LSI 4200 retransmit the packet whose error is received by notifying the data transmitting control unit 4140 of information about the packet whose error the LSI 4200 has received. The data transmitting control unit 4140 puts the pointer of the transmitting buffer 4120 back up to the storage position of a packet to be retransmitted. The transmitting packet processing unit 4130 reads the packet indicated by the pointer from the transmitting buffer 4120 and transfers the packet whose error is received by the LSI 4200 to the transmitting unit 4150. The transmitting unit 4150 transmits the packet received from the transmitting packet processing unit 4130 to the LSI 4200 via the transmission path 4300. Thus, a packet whose error is received by the LSI 4200 is retransmitted from the LSI 4100 to the LSI 4200.

When normally receiving a packet from the LSI 4100, the LSI 4200 notifies the LSI 4100 of the normal reception of the packet. When the LSI 4100 has received from the LSI 4200 the notice on the normal reception of the packet, the data transmitting control unit 4140 recognizes the normal reception of the packet and reflects it in the control of the pointer. Then, the data transmitting control unit 4140 continues to transmit packets to the LSI 4100.

Japanese Laid-open Patent Publication No. 2003-122465 discloses a technique for detecting the stoppage of data transmission/reception and correcting a termination resistance when the data transmission/reception is stopped. Japanese Laid-open Patent Publication No. 2001-175373 discloses a communication device provided with a dummy load means which can keep the impedance of a transmission line always equal to that of a termination resistor means.

The value (resistance value) of a termination resistor varies depending on the temperature of its ambient environment (for example, the temperature of an LSI chip) and the like. A computer system is often continuously operated for a long time. When the operation time becomes long, the temperature inside a device rises accordingly. Therefore, when a computer system is consecutively operated, the temperature of a semi-conductor device mounted on the computer system rises due to the heat of itself and its surroundings. Therefore, when a computer system is often consecutively operated for a long time, the resistance value of a termination resistor installed inside a semi-conductor device mounted on the computer system changes. Thus, in a high-speed transmission between LSIs in a computer system, a signal waveform to be transmitted is distorted by their impedance mis-matching and an error occurs in received data.

To cope with the above-described temperature change of a computer system, when a computer system is consecutively operated for a long time, it is desired to control in such a way that the resistance values of termination resistors installed at both ends of a transmission path between LSIs may always become optimal. However, when the resistance value of a termination resistor is modified within data transfer, sometimes data which can be normally transmitted without such a modification cannot be normally received. Therefore, it is desired to adjust the resistance value of a termination resistor in such a way that no error may be caused in data transfer.

SUMMARY

The transmission device according to an aspect of the invention presumes a transmission device including a transmitting circuit for transmitting data to a transmission path and a receiving circuit for receiving the data via the transmission path.

The transmitting circuit of the transmission device according to an aspect of the invention includes an error detection code generation unit, a transmitting circuit side transmitting unit, and a transmitting circuit side receiving unit.

The receiving circuit of the transmission device according to an aspect of the invention includes a receiving side termination unit, a receiving side termination unit adjustment unit, a receiving circuit side receiving unit, an error detection unit, a receiving circuit side transmitting unit, and a control unit.

The receiving side termination unit applies termination to the receiving circuit side of the transmission path. The receiving side termination unit adjustment unit updates the resistance value of the receiving side termination unit to an appropriate value. The receiving circuit side receiving unit receives the transmitting data transmitted from the transmitting circuit via the transmission path. The error detection unit detects the error of the data received by the receiving circuit side receiving unit. The receiving circuit side transmitting unit transmits the error-caused data retransmit request for requesting the retransmission of data in which an error has been detected by the error detection unit to transmitting circuit side receiving unit. The control unit shifts the system to a termination unit adjustment period using the detection of received data by the error detection unit as a trigger, and controls the receiving side termination unit adjustment unit within the termination unit adjustment period to update the resistance value of the receiving side termination unit to an appropriate value within the termination unit adjustment period by the receiving side termination unit.

The object and advantages of the invention will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIGS. 3A and 3B illustrate the data structure of a packet used to set a termination resistance adjustment period in the first preferred embodiment;

FIG. 4 illustrates how to update termination resistance in the first preferred embodiment;

FIGS. 6A and 6B is the configuration of the entirety of an inter-LSI transmission device that is the second preferred embodiment;

FIGS. 8A and 8B are the configuration of the entirety of an inter-LSI transmission device that is the third preferred embodiment;

FIG. 11 is a basic configuration of a transmission device for performing the transmission/reception of data between LSIs; and FIGS. 12A and 12B are an example of the general configuration of a conventional inter-LSI transmission device.

DESCRIPTION OF EMBODIMENTS

Preferred embodiments will be explained with reference to accompanying drawings.

Any of the first through third preferred embodiments described below is obtained by applying the transmission device of the present invention to a transmission device for transferring data between LSIs (inter-LSI transmission device). When a transmission error occurs within an inter-LSI data transfer period, the inter-LSI transmission device in this preferred embodiment enters a period for adjusting (updating) a termination resistance and corrects the resistance value of a termination resistor installed at the terminal end of a transmission path between LSIs to an appropriate value (a value equal to the resistance value of an external reference resistor externally installed in an LSI or a value similar to the resistance value of the external reference resistor) during the termination resistance adjustment period. During the termination resistance adjustment period, a receiving side LSI does not apply error check to received data. Although the inter-LSI transmission device in any of the first through third preferred embodiments is obtained by applying the present invention to a transmission device for transferring data using a packet, the present invention is not limited to a transmission device for transferring data in packets.

First Embodiment

{System Configuration of First Embodiment}

Figure 1B:
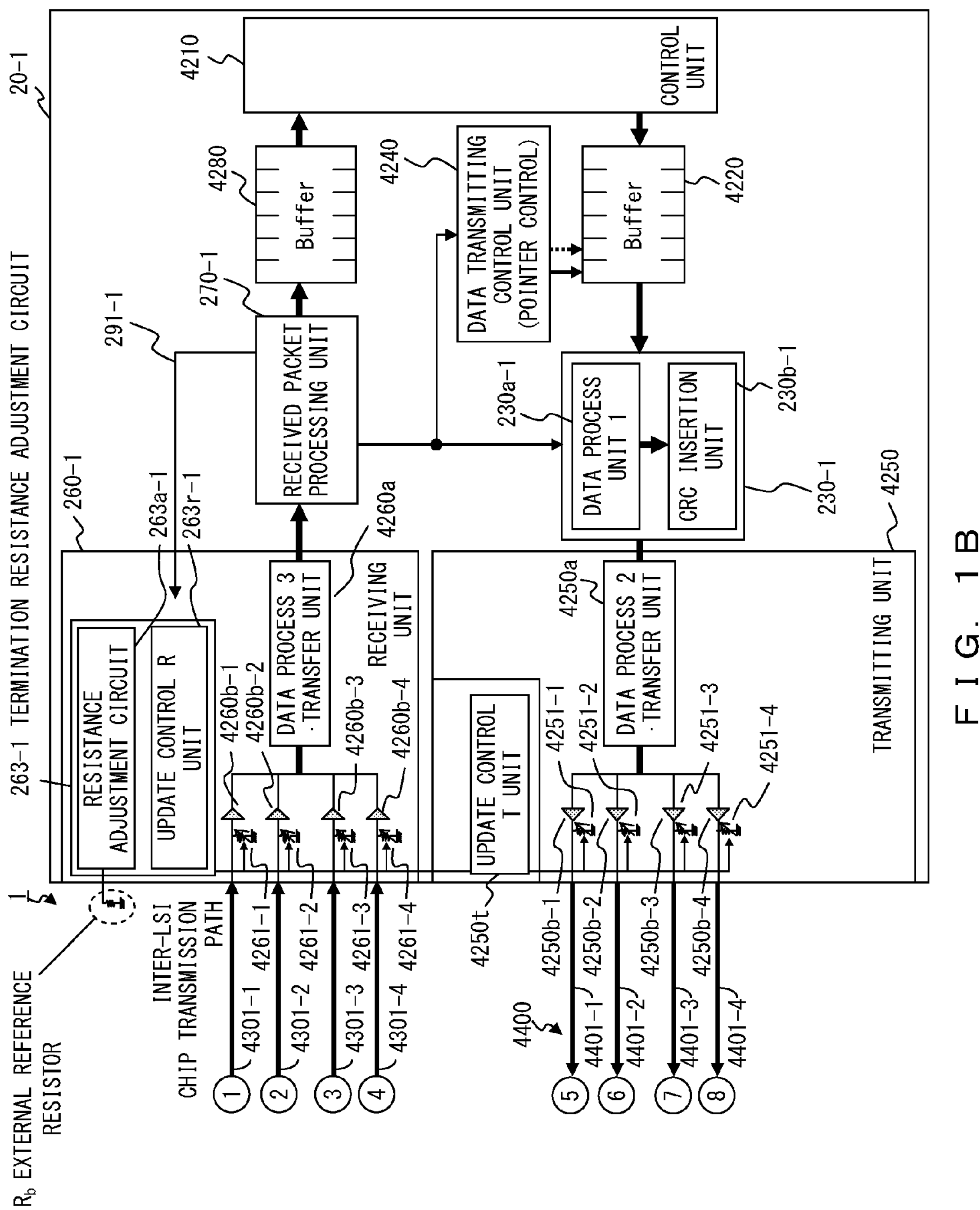
FIGS. 1A and 1B are the configuration of the entirety of an inter-LSI transmission device that is the first preferred embodiment.

FIGS. 1A and 1B is the configuration of the entirety of an inter-LSI transmission device that is the first preferred embodiment. The inter-LSI transmission device 1 illustrated in FIGS. 1A and 1B includes an LSI 10-1, an LSI 20-1, a transmission path 4300 (first transmission path), a transmission path 4400 (second transmission path), an external reference resistor Ra (first external reference resistor) and an external reference resistor Rb (second external reference resistor). In the inter-LSI transmission device 1, the LSI 10-1 corresponds to the LSI 4100 of the inter-LSI transmission device 4000 and the LSI 20-1 corresponds to the LSI 4200 of the inter-LSI transmission device 4000. The LSIs 10-1 and 20-1 can transmit/receive data between each other via the transmission paths 4300 and 4400. The inter-LSI transmission device 1 is an example of the mounting of the present invention.

Figure 12A:
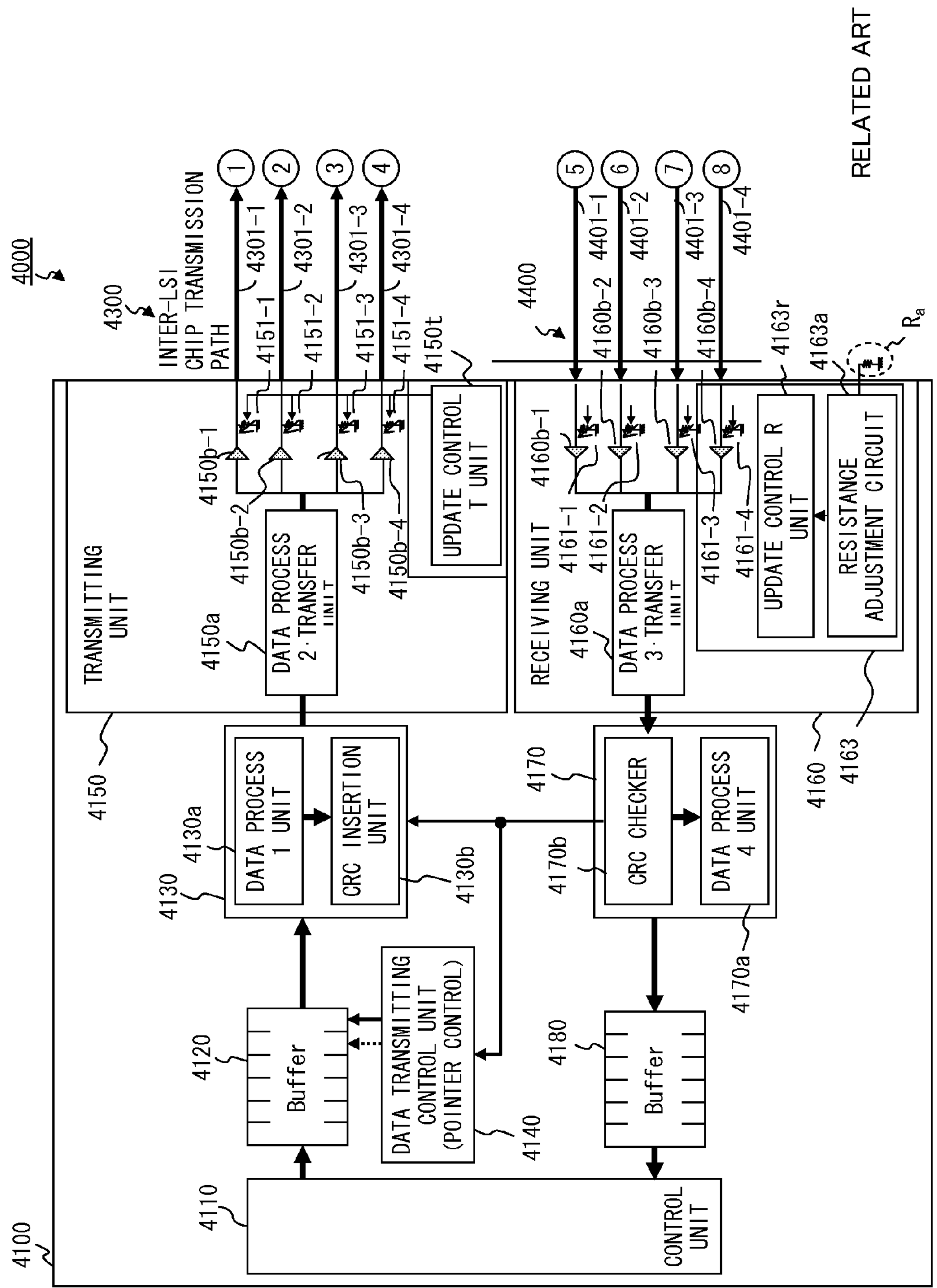

Components of the LSI 10-1 that are different from those of the LSI 4100 illustrated in FIGS. 12A and 12B are a transmitting packet processing unit 130-1, a receiving unit 160-1, and a received packet processing unit 170-1. In the receiving unit 160-1, the configuration of a termination resistance adjustment circuit 163-1 differs from that of the termination resistance adjustment circuit 4163. The termination resistance adjustment circuit 163-1 includes a resistance adjustment circuit 163*a*-1 and a receiving side update control R unit 163*r*-1. The received packet processing unit 170-1 and the termination resistance adjustment circuit 163-1 in the receiving unit 160-1 are connected by a signal wire 191-1.

The LSI 20-1 has the same configuration as the LSI 10-1. In FIGS. 1A and 1B, the same descriptions are attached to components common to the LSI 20-1 and the LSI 10-1. However, reference numerals different from those of the LSI 10-1 are attached to the components of the LSI 20-1. This also applies to FIGS. 6 and 8, which will be described later.

The transmitting unit 4150 of the LSI 10-1 is connected to the receiving unit 260-1 of the LSI 20-1 via the transmission path 4300. The receiving unit 160-1 of the LSI 10-1 is connected to the transmitting unit 4250 of the LSI 20-1 via the transmission path 4400. When transmitting data to the LSI 20-1, the LSI 10-1 transmits data to the LSI 20-1 via the transmission path 4300 by the transmitting unit 4150. In this case, the LSI 10-1 can receive a packet from the LSI 20-1 via the transmission path 4400 by the receiving unit 160-1.

Similarly, data can also be transmitted from the LSI 20-1 to the LSI 10-1. In this case, the LSI 20-1 transmits data to the LSI 10-1 via the transmission path 4400 by the transmitting unit 4250. In this case, the LSI 20-1 can receive a packet from the LSI 10-1 via the transmission path 4300 by the receiving unit 260-1.

In the first preferred embodiment, a transmitting side LSI transmits a special packet having a function different from a normal packet for transmitting data to a receiving side LSI during a termination resistance adjustment period. The detailed structure/function of this special packet will be described later.

The transmitting packet processing unit 130-1 includes a data process 1 unit 130*a*-1 and a CRC insertion unit 130*b*-1. The transmitting packet processing unit 130-1 outputs the special packet to the transmitting unit 4150 during the termination resistance adjustment period in addition to the same function as the above-described transmitting packet processing unit 4130. The data process 1 unit 130*a*-1 generates this special packet. The CRC insertion unit 130*b*-1 has the same function as the above-described CRC insertion unit 4130*b*.

In addition to the same function as the received packet processing unit 4170 illustrated in FIGS. 12A and 12B, the received packet processing unit 170-1 (270-1) detects the data error of data (a packet) received from a transmitting side LSI and if the error frequency (error rate) of a received packet exceeds a predetermined regulation value, it outputs a signal (termination resistance value update notice) for notifying the termination resistance adjustment circuit 163-1 (263-1) of the receiving unit 160-1 (260-1).

The receiving unit 160-1 (260-1) includes a termination resistance adjustment circuit 163-1 (263-1) having a configuration different from the termination resistance adjustment circuit 4163 provided for the receiving unit 4160 illustrated in FIGS. 12A and 12B. The termination resistance adjustment circuit 163-1 (263-1) includes a resistance adjustment circuit 163*a*-1 (263*a*-1) and a receiving side update control R unit 163*r*-1 (263*r*-1). The resistance adjustment circuit 163*a*-1 (263*a*-1) has almost the same function as the resistance adjustment circuit 4163*a* illustrated in FIGS. 12A and 12B. The receiving side update control R unit 163*r*-1 (263*r*-1) has the following functions in addition to having the same functions as the above-described receiving side update control unit 4163*r*. When receiving the termination resistance value update notice signal from the received packet processing unit 170-1 (270-1), the receiving side update control R unit 163*r*-1 (263*r*-1) notifies the termination resistors 4161-1 through 4161-4 of an optimal resistance value adjusted by the resistance adjustment circuit 163*a*-1 (263*a*-1) and updates the resistance values of the termination resistors 4161-1 through 4161-4 to the optimal values at that time.

However, the resistance values of the termination resistors 4151-1 through 4151-4 are modified to optimal values by the update control T unit 4150*t* as usual.

{Summary of the Entire Operation of First Embodiment}

A summary of the entire operation of the transmission device 1 in the first preferred embodiment will be given below using a data transfer from the LSI 10-1 to the LSI 20-1 as an example.

A packet transferred from the control unit 4110 of the LSI 10-1 (packet storing transfer data) is transferred to the transmitting unit 4150 via the transmitting buffer 4120 and the transmitting packet processing unit 130-1. At this moment, the CRC insertion unit 130*b*-1 of the transmitting packet processing unit 130-1 attaches a CRC code to the packet received from the control unit 4110. The transmitting unit 4150 of the LSI 10-1 transmits the packet to which the CRC code is attached (normal packet) to the transmission path 4300.

The LSI 20-1 receives the normal packet transmitted from LSI 10-1 to the transmission path 4300 by the receiving unit 260-1. The LSI 20-1 applies a CRC error check performed by the received packet processing unit 270-1 to the normal packet received by the receiving unit 260-1 and checks whether there is an error in the normal packet. In this case, if the received packet processing unit 270-1 determines that there is an error in the normal packet, the LSI 20-1 transmits a retransmit request to the LSI 10-1 via the transmission path 4400 by the transmitting unit 4250.

The LSI 10-1 receives the normal packet transmitted from LSI 20-1 to the transmission path 4400 by the receiving unit 160-1. The receiving unit 160-1 of the LSI 10-1 transfers the retransmit request to the received packet processing unit 170-1. The received packet processing unit 170-1 notifies the data transmitting control unit 4140 of information (information necessary for retransmission) set in the retransmit request. Upon receipt of the information, the data transmitting control unit 4140 returns the pointer of the transmitting buffer 4120 to the storage position of the data (data to be retransmitted to the LSI 20-1). The transmitting packet processing unit 130-1 reads the data to be retransmitted from the transmitting buffer 4120 and generates a packet to which a CRC code is attached (packet storing the data to be retransmitted). The LSI 10-1 transmits the packet storing the data to be retransmitted generated by the transmitting packet processing unit 130-1 to the LSI 20-1 via the transmission path 4300 by the transmitting unit 4150. Thus, the failed data is retransmitted from the LSI 10-1 to the LSI 20-1.

The LSI 20-1 measures the error rate of a normal packet received from the LSI 10-1 by the received packet processing unit 270-1. When it is determined by the received packet processing unit 270-1 that the error rate of a normal packet received from the LSI 10-1 exceeds a regulation value, the LSI 20-1 transmits a termination resistance value adjust request issue request packet to the LSI 10-1 via the transmission path 4400 from the transmitting unit 4250. When the receiving unit 160-1 receives the termination resistance value adjust request issue request packet from the transmission path 4400, the LSI 10-1 transmits the termination resistance adjust request to the LSI 20-1 via the transmission path 4300 from the transmitting unit 4150. When the receiving unit 260-1 (normally) receives the termination resistance adjust request from the transmission path 4300, the LSI 20-1 enters a termination resistance value adjustment period. The LSI 20-1 updates the resistance values of the termination resistors 4261-1 through 4261-4 to the optimal values at that time within this termination resistance value adjustment period under the control of the termination resistance adjustment circuit 263-1. The details of the update process of the termination resistors 4261-1 through 4261-4 of this LSI 20-1 within the termination resistance value adjustment period will be described later. After the update of the resistance values of the termination resistors 4261-1 through 4261-4 is completed, the LSI 20-1 transmits a termination resistance value update complete packet to the LSI 10-1 via the transmission path 4400 from the transmitting unit 4250. When the receiving unit 160-1 receives the termination resistance value update complete packet transmitted by the LSI 20-1 from the transmission path 4400, the LSI 10-1 re-starts the transmission of normal packets to the LSI 20-1.

When no CRC error is detected in the packet received from the LSI 10-1 by the received packet processing unit 270-1, the LSI20-1 notifies the LSI10-1 of the normal reception of the packet via the transmission path 4400 using the transmitting unit 4250. Upon receipt of the notice of the normal reception of a packet from the LSI 20-1, the LSI 10-1 controls the pointer of the transmitting buffer 4120 by the data transmitting control unit 4140-1 to continue the data transfer to the LSI 20-1.

Figure 2:
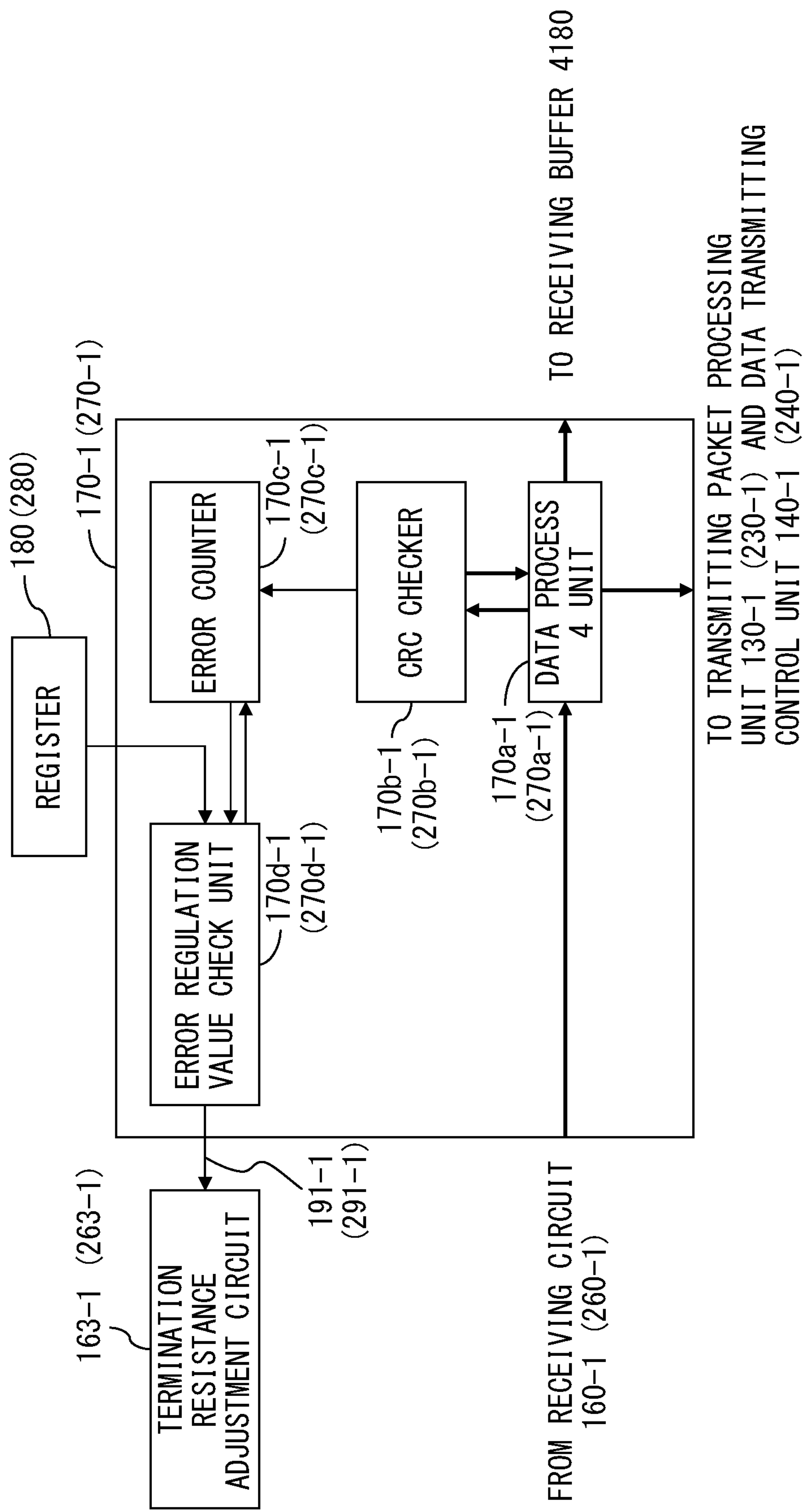
FIG. 2 is an example of the configuration of a received packet processing unit in the first preferred embodiment.

FIG. 2 is an example of the configuration of the received packet processing unit 170-1 of the LSI 10-1 (received packet processing unit 270-1 of the LSI 20-1) in the first preferred embodiment.

The received packet processing unit 170-1 (270-1) illustrated in FIG. 2 includes a data process 4 unit 170*a*-1 (270*a*-1), a CRC checker 170*b*-1 (270*b*-1), an error counter 170*c*-1 (270*c*-1), and an error regulation value check unit 170*d*-1 (270*d*-1).

The data process 4 unit 170*a*-1 (270*a*-1) receives a received packet from the receiving unit 160-1 (260-1). The CRC checker 170*b*-1 (270*b*-1) checks by using the CRC whether there is a data error (CRC error) in the received packed received from the receiving unit 160-1 (260-1) and returns the check result to the data process 4 unit 170*a*-1 (270*a*-1). Upon receipt of the check result from the CRC checker 170*b*-1 (270*b*-1), if there is no error, the data process 4 unit 170*a*-1 (270*a*-1) removes the CRC code from the received packet and writes the received packet in the receiving buffer 4180. If there is any error, the CRC checker 170*b*-1 (270*b*-1) outputs an error-detected signal to the error counter 170*c*-1 (270*c*-1). The error counter 170*c*-1 (270*c*-1) counts the number of errors in a received packet and increases in increments the number every time the error counter 170*c*-1 (270*c*-1) inputs an error-detected signal.

The error regulation value check unit 170*d*-1 (270*d*-1) stores a regulation value (error regulation value) for error rate counting inside and compares the value of the error counter 170*c*-1 (270*c*-1) with the error regulation value. Then, if the value of the error counter 170*c*-1 (270*c*-1) exceeds the error regulation value, the error regulation value check unit 170*d*-1 (270*d*-1) determines that the error rate of the received packet exceeds its allowable error rate and issues a termination resistance update instruction to the termination resistance adjustment circuit 163-1 (263-1) via the signal wire 191-1 (291-1). It is assumed here that the allowable value of an error rate is, for example, ten times per minute. The error rate is set to an appropriate value according to the transfer speed of a packet. In the case of the first preferred embodiment, the register 180 (280) illustrated in FIG. 2 is installed inside the LSIs 10-1 and 20-1. The value of this register 180 (280) can be externally modified via an external I/F (external interface) installed in the LSIs 10-1 and 20-1. The error regulation value stored in the error regulation value check unit 170*d*-1 (270*d*-1) is set in such a way as to equal the value of the register 180 (280). Therefore, by modifying the value of the register 180 (280), the error regulation value stored in the error regulation value check unit 170*d*-1 (270*d*-1) can be modified. The counter value of the error counter 170-*c*-1(270*c*-1) can be reset to "0" by the error regulation value check unit 170*d*-1 (270*d*-1) after a time determined according to the unit measurement time of an error rate.

When detecting a CRC error in a received packet, the received packet processing unit 170-1 (270-1) notifies the transmitting packet processing unit 130-1 (230-1) and the data transmitting control unit 4140-1 (4240-1) of information about a received packet in which the CRC error occurs.

{Data Structure of Packet}

FIGS. 3A and 3B illustrate the data structure of a packet used to set a termination resistance adjustment period in the first preferred embodiment.

As illustrated in FIG. 3B, in the first preferred embodiment, the following packet (control packet) is used to set a termination resistance adjustment period.

(1) Termination resistance adjust request issue request packet: When the error rate of a received packet exceeds a regulation value, a receiving side LSI requests a transmitting side LSI to issue a "termination resistance adjust request".

(2) Termination resistance adjust request: A transmitting side LSI instructs a receiving side LSI to enter a period for updating the resistance value in a termination resistor in the receiving side LSI in such a way as to equal the resistance value of an external reference resistor (termination resistance adjustment period).

(3) Operation return request: A transmitting side LSI notifies an opposite LSI of the termination of a termination resistance adjustment period.

(4) Termination resistance value update complete packet: A receiving side LSI reports that it has received an operation return request from a transmitting side LSI.

(5) Non-operation packet: Invalid packet transmitted from a transmitting side to a receiving side during a termination resistance adjustment period, and more particularly between a termination resistance adjustment request and an operation return request FIG. 3A illustrates the data structures of the above five types of packets. A packet in this format is controlled by the transmitting packet processing unit 130-1. As illustrated in FIG. 3A, the header 210 of a packet 200 has fields such as "R", "Fmt", "Type", "Length" and the like. A field R is composed of one bit and a value indicating "Reserved" is set in the field. A field Fmt is composed of three bits and a value indicating the format of a packet is set in the field. In the case of this preferred embodiment, "111" is set in the field. A field Type is composed of four bits and as illustrated in FIG. 3B, a value indicating the type of a packet is set in the field. A value indicating the size of data (data length) stored in the data section of the packet 200 is set in a field Length. In the packet format of the present invention, the field Length is not valid (for example, it is OK if a value of "0" is input for all). The CRC insertion unit 130*b*-1 of the transmitting packet processing unit 130-1 generates the CRC code of this entire packet and attaches the CRC code to the end of the packet 200. K illustrated in FIG. 3A indicates the end of a packet in the case of normal data transfer.

{How to Update Termination Resistance}

FIG. 4 illustrates how to update termination resistance in the first preferred embodiment.

In the first preferred embodiment, a termination resistance adjustment period is provided within data transfer between LSIs and the resistance value of a termination resistor in a receiving side LSI is updated to an appropriate value within this termination resistance adjustment period without destroying data currently transmitted.

FIG. 4 is an example of data transfer between the LSIs 10-1 and 20-1. FIG. 4A illustrates packet transmission from the LSI 10-1 to the LSI 20-1 and FIG. 4B illustrates packet transmission from the LSI 20-1 to the LSI 10-1. In FIG. 4, a packet is transmitted along the direction of the arrow of a time axis t (time (t)) indicated in FIG. 4. Therefore, the left and right ends in FIG. 4 indicate the earliest and the latest packets, respectively.

As illustrated in FIG. 4 of a upper part (a), the LSI 10-1 transmits a normal packet to the LSI 20-1 during a normal operation period (Pn1, Pn2). As illustrated in FIG. 4 of a lower part (b), when detecting that the error rate of a packet received from the LSI 10-1 exceeds a regulation value within the normal operation period (Pn1) of the LSI 10-1, the LSI 20-1 transmits a termination resistance adjust request issue request packet to the LSI 10-1 (time t0). Upon receipt of the termination resistance adjust request issue request packet transmitted by the LSI 20-1, the LSI 10-1 transmits a termination resistance adjust request to the LSI 20-1 (time t1). By the transmission of this termination resistance adjust request, the normal operation period (Pn1) shifts to a termination resistance adjustment period (Pt). While the LSI 10-1 is transmitting a non-operation packet (invalid packet) (t2 through t5), the LSI 20-1 updates the resistance value of the termination resistor of its own LSI to a normal value. In the example illustrated in FIG. 4 of the upper part (a), the LSI 20-1 updates the resistance value of the termination resistor of its own LSI at t4.

After the update of the resistance value of the termination resistor of its own LSI is completed, the LSI 20-1 waits for the transmission of an operation return request from the LSI 10-1. Then, when receiving the operation return request transmitted by the LSI 10-1, the LSI 20-1 transmits a termination resistance value update complete packet to the LSI 10-1 (time t6). Upon receipt of the termination resistance value update complete packet transmitted by the LSI 20-1, the LSI 10-1 enters a normal operation period (Pn2) (time t7). When entering the normal operation period (Pn2), the LSI 10-1 starts the transmission of a normal packet to the LSI 20-1 (time t8). After the transmission of a termination resistance value update complete packet to the LSI 10-1 is completed, the LSI 20-1 continues to transmit a normal packet to the LSI 10-1. The LSI 20-1 continues to transmit a normal packet to the LSI 10-1 until the termination resistance value update complete packet is transmitted after the termination resistance adjust request issue request packet is transmitted.

As described above, in the first preferred embodiment, during the termination resistance adjustment period (Pt), a receiving side LSI in which the error rate of a received packet exceeds a regulation value updates the resistance value of the termination resistor of its own LSI to an appropriate resistance value, using the external reference resistor Rb. The termination resistance adjustment period (Pt) is started by a receiving side LSI in which the error rate of a received packet exceeds a regulation value for transmitting a termination resistance adjust request issue request packet to a transmitting side LSI that transmits a packet to its own LSI and by the transmitting side LSI that has received this termination resistance adjust request issue request packet for transmitting a termination resistance adjust request to the receiving side LSI and the receiving side LSI receiving this termination resistance adjust request. The termination resistance adjustment period (Pt) is terminated by a transmitting side LSI transmitting an operation return request to a receiving side LSI, the receiving side LSI that has received this operation return request transmitting a termination resistance update complete packet to the transmitting side LSI and the transmitting side LSI receiving this termination resistance value update complete packet.

{Operation of First Embodiment}

Figure 5:
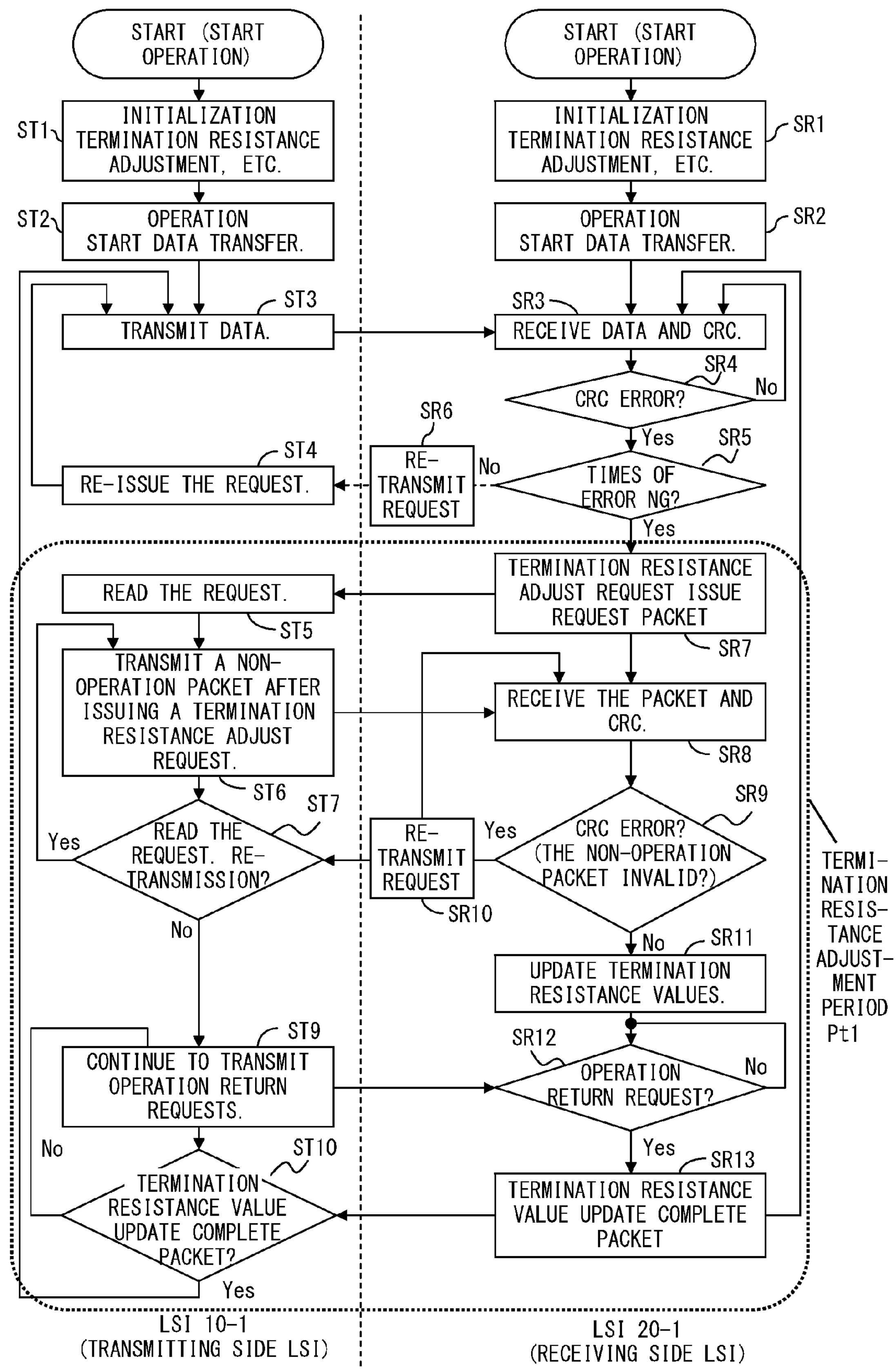
FIG. 5 is a flowchart illustrating the procedure of the update process of termination resistance in the first preferred embodiment.

FIG. 5 is a flowchart illustrating the operation of the first preferred embodiment. FIG. 5 explains an example of the case where an error occurs in the transmission path 4300 between chips for transmitting data from the LSI 10-1 to the LSI 20-1 and it becomes necessary to update the resistance value of the terminal resistor of the LSI 20-1 (receiving side LSI). In FIG. 5, the left and right sides illustrate the operations of the LSIs 10-1 and 20-1, respectively. The portion enclosed with a broken line on the button side of FIG. 5 illustrates the process in a termination resistance adjustment period Pt1 of both the LSIs. In FIG. 5, the CRC check of a packet received from the LSI 20-1 by the LSI 10-1 is omitted for convenience' sake. In reality, the LSI 10-1 also applies CRC check to a received packet, as in the LSI 20-1.

Prior to a data transfer from the LSI 10-1 to the LSI 20-1, both the LSIs perform an initialization process (steps ST1 and SR1). In this initialization, the adjustment of an internal termination resistor, the initial setting of other components, and the like are performed. By this process, the resistance values of the terminal resistors 4151-1 through 4151-4 and 4161-1 through 4161-4 of the LSI 10-1, and the terminal resistors 4251-1 through 4251-4 and 4261-1 through 4261-4 of the LSI 20-1 are set to appropriate values on the basis of the external reference resistors Ra and Rb, respectively.

Then, both the LSIs start the operation of a normal data transfer (steps ST2 and SR2).

The LSI 10-1 transmits data to the LSI 20-1 (step ST3) and proceeds to a process in step ST4. In step ST3, the LSI 10-1 transmits data using a packet to which a CRC code is attached. When receiving data transmitted to the transmission path 4300 by the LSI 10-1, the LSI 20-1 determines whether there is a CRC error in the received packet on the basis of the CRC code attached to the packet (step SR4). Specifically, it is determined whether there is an error in the received data. If in step SR4 it is determined that there is no CRC error (No in step SR4), the LSI 20-1 returns to step SR3 and prepares for the reception of subsequent data from the LSI10-1. If the occurrence of a CRC error is detected in step SR4 (Yes in step SR4), the LSI 20-1 proceeds to a process in step SR5.

In step SR5, the LSI 20-1 increments the time of the CRC error (add "1"). Then, the LSI 20-1 determines whether the rate of the CRC error (CRC error rate) exceeds a regulation value on the basis of the times of CRC errors obtained by the increment. If it determines that the CRC error rate does not exceed the regulation value (No in step SR5), the LSI 20-1 transmits a retransmit request to the LSI 10-1 (step SR6).

When receiving the retransmit request transmitted by the LSI 20-1 in step SR6, in step ST4 the LSI 10-1 reads from the transmitting buffer 4120 the data whose retransmission is requested and re-issues a packet for data transfer in the transmitting packet processing unit 130-1. Then, the LSI 10-1 returns to the process of step ST3 and in step ST3 retransmits the data whose retransmission is requested by the LSI 20-1.

If it is determined that the CRC error rate exceeds the regulation value (Yes in step SR5), the LSI 20-1 proceeds to a process in step SR7. In steps SR7 and after, the LSIs 10-1 and 20-1 perform the process of the termination resistance value adjustment period Pt1. In this case, since the data fails, in step SR6 the LSI 20-1 transmits a retransmit request to the LSI 10-1.

In this example, if the CRC error rate of the data received by the LSI 20-1 exceeds the regulation value, both the LSIs (LSIs 10-1 and 20-1) transition to the termination resistance adjustment period Pt1.

Next, the process during the termination resistance adjustment period Pt1 of both the LSIs will be explained.

In the termination resistance adjustment period Pt1, firstly, the LSI20-1 transmits a packet for requesting to issue a "termination resistance adjust request" (terminal resistance adjust request issue request packet) to the LSI 10-1 (step SR7) and waits for the reception of data transmitted from the LSI 10-1 (step SR8). Upon receipt of the terminal resistance adjust request issue request packet transmitted by the LSI 20-1, the LSI 10-1 reads the packet to recognize that the LSI 20-1 has transmitted a terminal resistance adjust request issue request packet, transmits a terminal resistance adjust request to the LSI 20-1, and then transmits a non-operation packet a predetermined number of times (step ST6).

When receiving the packet from the LSI 10-1 in step SR7, the LSI 20-1 applies a CRC check to the packet (step SR8). Then, the LSI 20-1 determines whether there is a CRC error in the packet received from the LSI 10-1 (step SR9). If there is a CRC error in the packet received from the LSI 10-1 (Yes in step SR9), the LSI 20-1 transmits a retransmit request to the LSI 10-1 (step SR10) and then returns to step SR8. If in step SR8 it is determined that a termination resistance adjust request (there is no CRC error in the packet) is received (No in step SR9), then the LSI 20-1 proceeds to step SR11.

The LSI 10-1 reads (checks) the contents of the packet from the LSI 20-1 as it was at the time of normal operation and determines whether the packet is a retransmit request (step ST7). If it determines that it is a retransmit request (Yes in step ST7), the LSI 10-1 returns to step ST6 and in step ST6 retransmits a termination resistance adjust request and a non-operation packet following it to the LSI 20-1.

Thus, the processes of steps ST6 and ST7 by the LSI 10-1 and the processes of steps SR8 through SR10 by the LSI 20-1 are repeatedly performed until the LSI 20-1 correctly receives a termination resistance adjust request transmitted by the LSI 10-1. Specifically, the LSI 10-1 retransmits a termination resistance adjust request to the LSI 20-1 until the LSI 20-1 normally receives a termination resistance adjust request.

In other words, as long as the LSI 20-1 does not request the transmission of a termination resistance adjust request, the LSI 10-1 transmits a non-operation packet to the LSI 20-1 a predetermined number of times. If a request is made by the LSI 20-1 to retransmit it, the LSI 10-1 re-performs packet transmission to the LSI 20-1 starting from a termination resistance adjust request. Step ST7 is the same function as normal operation and the LSI 10-1 always checks data received from the LSI 20-1. In FIG. 5, it is not clearly illustrated, for convenience' sake. The number of non-operation packets transmitted to the LSI 20-1 by the LSI 10-1 is determined, taking into consideration a time period required until the LSI 20-1 completes the update of the resistance value of the termination resistor of its own LSI after the LSI 20-1 normally receives a termination resistance adjust request.

The LSI 20-1 receives the non-operation packets transmitted by the LSI 10-1 and applies CRC error check to the non-operation packets (step SR8). After receiving the termination resistance adjust request, the LS20-1 nullifies a CRC error even when there is a CRC error in the non-operation packet received from the LSI 10-1. Therefore, when, in step SR8, receiving a non-operation packet transmitted by the LSI 20-1, the LSI 20-1 passes over a process in step SR9 and proceeds to a process in step SR11. Thus, after receiving a termination resistance adjust request from the LSI 10-1, the LSI 20-1 releases the CRC error check of a packet received from the LSI 10-1.

In step SR11, the LSI 20-1 updates the resistance values of termination resistors (termination resistors 4261-1 through 4261-4) of its own LSI to the optimal values at the time by using a termination resistor adjustment circuit 263-1.

Thus, when a termination resistance adjust request is correctly received from the LSI 10-1, the LSI 20-1 releases the CRC error check of a packet transmitted from the LSI 10-1 for a certain period and completes a process for updating the resistance value of the termination resistors of its own LSI to the optimal values at the time within the certain period. After completing the update of the termination resistance values of its own LSI in step SR11, the LSI 20-1 re-starts the CRC error check of a packet received from the LSI 10-1 and proceeds to a process in step SR12.

After completing the transmission of non-operation packets to the LSI 20-1 in step ST6, the LSI 10-1 transmits an operation return request to the LSI 20-1 (step ST9) and then proceeds to a process in step ST10.

In step SR12, the LSI 20-1 determines whether the packet received from the LSI 10-1 is an operation return request. If the packet received from the LSI 10-1 is not an operation return request, that is, is a non-operation packet (No in step SR12), the LSI 20-1 repeats the process of step SR12. If in step SR12 it is determined that the packet received from the LSI 10-1 is an operation return request (Yes in step SR12), then the LSI 20-1 transmits a termination resistance value update complete packet to the LSI 10-1 (step SR13).

In step ST10, the LSI 10-1 determines whether the packet received from the LSI 20-1 is a termination resistance value update complete packet. If it determines that the packet received from the LSI 20-1 is not a termination resistance value update complete packet (No in step ST10), the LSI 10-1 returns to step ST9 and in step ST9 retransmits an operation return request to the LSI 20-1. If in step ST10 the packet received from the LSI 20-1 is a termination resistance value update complete packet (Yes step ST10), the LSI 10-1 returns to step ST3.

Thus, in step ST9 the LSI10-1 continues to transmit an operation return request to the LSI 20-1 until in step ST10 it determines that it has received a termination resistance value update complete packet from the LSI 20-1. Then, by the LSI 20-1 returning a termination resistance value update complete packet to the LSI 10-1 in response to the operation return request from the LSI 10-1 and the LSI 10-1 recognizing the receipt of the termination resistance value update complete packet, the termination resistance adjustment period Pt1 is terminated (see the termination resistance value adjustment period Pt illustrated in FIG. 4). After the termination resistance value adjustment period Pt1 is terminated, the LSI 10-1 returns to a normal operation. It is, for example, when the received packet is a normal packet that in step ST10 the LSI 10-1 determines that it is No.

Second Embodiment

The second preferred embodiment is also provided with a termination resistance adjustment period within data transfer and updates the resistance value of the termination resistors on a receiving side LSI within this termination resistance adjustment period to the optimal values at the time, as in the first preferred embodiment. The second preferred embodiment updates termination resistance on the receiving side LSI within this termination resistance adjustment period, using a method different from that in the first preferred embodiment. More specifically, a transmitting side LSI continues to transmit an NOP packet to the receiving side LSI a regulated number of times within the termination resistance adjustment period. On the other hand, the receiving side LSI measures the time of the termination resistance adjustment period using a user. Then, the receiving side LSI updates the termination resistance of its own LSI within this termination resistance adjustment period. A value obtained by the timer measuring the time of the termination resistance adjustment period (hereinafter called "timer value") is set/modified via, for example, a register for a timer value setting installed inside the LSI.

{System Configuration of Second Embodiment}

FIGS. 6A and 6B are the configuration of the entirety of an inter-LSI transmission device 2 that is the second preferred embodiment. In FIGS. 6A and 6B, the same reference numerals are attached to the same components as those of the inter-LSI transmission device 1 illustrated in FIGS. 1A and 1B.

In the inter-LSI transmission device 2, LSIs 10-2 and 20-2 correspond to the LSIs 4100 and 4200, respectively, of the inter-LSI transmission device 4000. The LSIs 10-2 and 20-2 can transmit/receive data to/from each other via the transmission paths 4300 and 4400. The inter-LSI transmission device 2 is one example of the detailed mounting of the present invention.

Differences in configuration/function between the inter-LSI transmission devices 1 and 2 will be explained below.

A transmitting packet processing unit 130-2 includes a data process 1 unit 130*a*-2 and a CRC insertion unit 130*b*-2. The transmitting packet processing unit 130-2 generates neither a non-operation packet nor an operation return request, unlike the transmitting packet processing unit 130-1 of the first preferred embodiment. The transmitting packet processing unit 130-2 generates a regulated number of NOP packets within the termination resistance adjustment period and transfers the generated NOP packets to the transmitting unit 4150. The transmitting unit 4150 transmits the NOP packets transferred from the transmitting packet processing unit 130-2 to the LSI 20-2 via the transmission path 4300.

A termination resistance adjustment circuit 163-2 includes a resistance adjustment circuit 163*a*-2, a receiving side update control R unit 163*r*-2 and a timer control unit 163*t*-2. The receiving side update control R unit 163*r*-2 is connected to a data process 4 unit 170*a*-2 in a received packet processing unit 170-2 by a signal wire 191-2.

The termination resistance adjustment circuit 163-2 has the same configuration/function as the termination resistance adjustment circuit 163-1 in the first preferred embodiment. The receiving side update control R unit 163*r*-2 has a function to communicate with the timer control unit 163*t*-2 in addition to the functions provided for the receiving side update control R unit 163*r*-1. When the LSI 10-2 is a receiving side LSI, the timer control unit 163*t*-2 measures the time of a termination resistance adjustment period under the instruction of the receiving side update control R unit 163*r*-2. When the termination resistance adjustment period is started, the receiving side update control R unit 163*r*-2 instructs the timer control unit 163*t*-2 to measure the time of the termination resistance adjustment period. When being instructed to measure the time of the termination resistance adjustment period by the receiving side update control R unit 163*r*-2, the timer control unit 163*t*-2 starts measuring the time of the termination resistance adjustment period. When the measured time reaches a predetermined time, the timer control unit 163*t*-2 notifies the receiving side update control R unit 163*r*-2 that it has become the update time of the resistance values of the termination resistors. When receiving a termination resistance adjust request, which will be described later, the receiving side update control R unit 163*r*-2 updates the resistance values of the termination resistors. When receiving the above notice from the timer control unit 163*t*-2, the receiving side update control R unit 163*r*-2 returns to a normal operation. A normal operation is performed by the transmitting packet processing unit 170-2.

Then, after the measuring of the time is completed, the termination of a timer time is reported to the receiving side update control R unit 163*r*-2. Furthermore, after notifying the receiving side update control R unit 163*r*-2 of the termination of a timer, the receiving side update control R unit 163*r*-2 returns to a normal operation.

When the LSI 10-2 is a transmitting side LSI, the data process 1 unit 130*a*-2 of the transmitting packet processing unit 130-2 controls so as to transmit the NOP packets to the LSI 20-2 that is a receiving side LSI.

{Update Process Procedure of Termination Resistor}

As described above, the second preferred embodiment (inter-LSI transmission device 2) differs from the first preferred embodiment (inter-LSI transmission device 1) in only the operation during the termination resistance value adjustment period. Therefore, mainly the operation during the termination resistance value adjustment period in the second preferred embodiment will be explained below.

Figure 7:
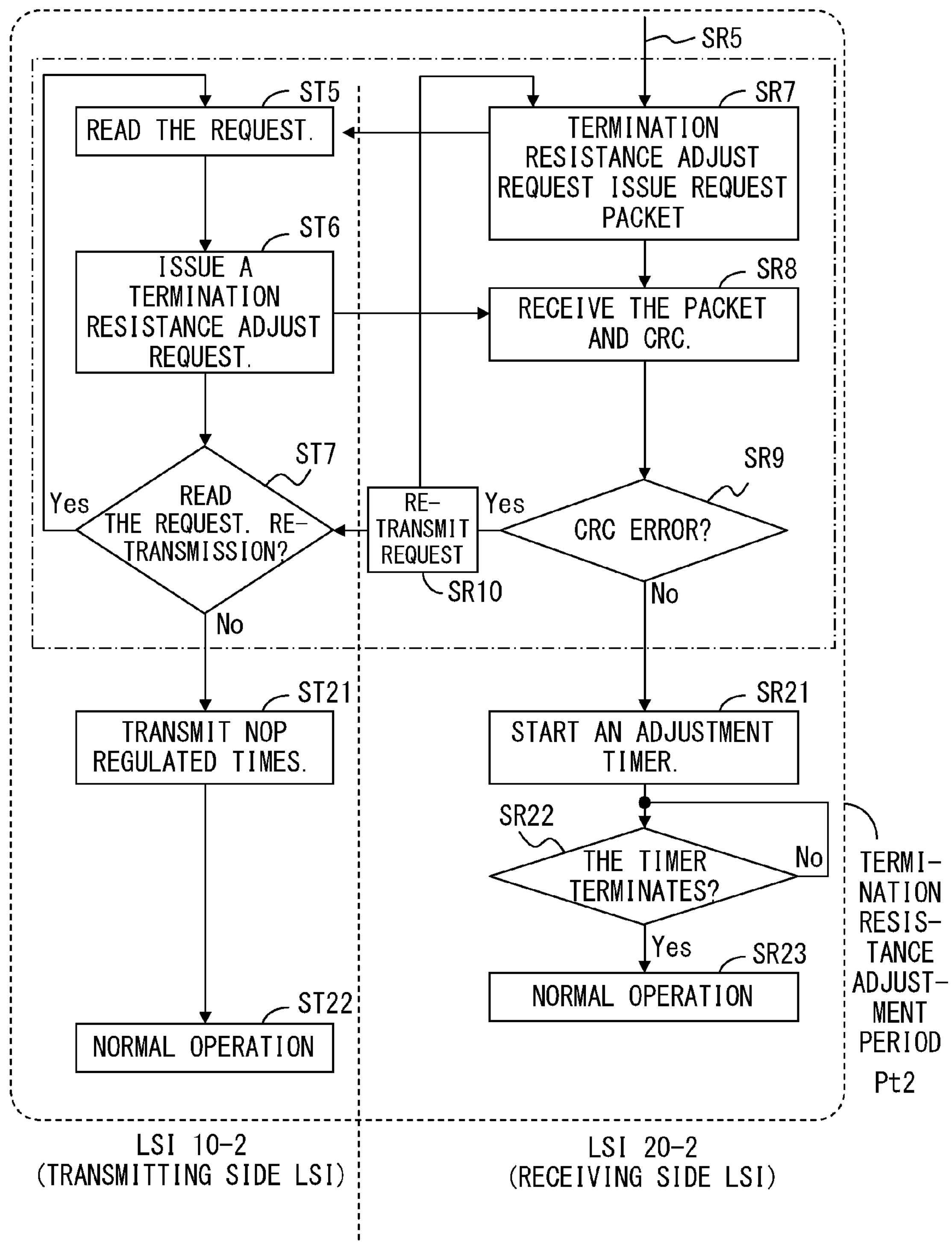
FIG. 7 is a flowchart illustrating the procedure of the update process of termination resistance in the second preferred embodiment.

The entire operation of the inter-LSI transmission device 2 can be obtained by replacing the termination resistance value adjustment period Pt1 of the flowchart illustrated in FIG. 5 with the termination resistance value adjustment period Pt2 enclosed by a broken line in FIG. 7. Therefore, the operation of the inter-LSI transmission device 2 will only be explained in the points of its operation that are different from the inter-LSI transmission device 1 below with reference to the flowchart illustrated in FIG. 7.

FIG. 7 is a flowchart illustrating the procedure of the update process of termination resistance in the second preferred embodiment and illustrates the process during the termination resistance value adjustment period Pt2 of the inter-LSI transmission device 2. In FIG. 7 the left and right sides of a vertical line indicated by a broken line illustrate the processes of the LSIs 10-2 (transmitting side LSI) and LSI 20-2 (receiving side LSI), respectively. In FIG. 7, the CRC error check of a packet received from the LSI 20-2 by the LSI 10-2 is omitted for convenience' sake. Actually, the LSI 10-2 also performs the CRC error check of a received packet like the LSI 20-2.

The operations during a termination resistance value adjustment period of the LSIs 10-2 and 20-2 will be explained below with reference to the flowchart illustrated in FIG. 7.

Like the inter-LSI transmission device 1, when in step SR5 of the flowchart illustrated in FIG. 5 the LSI 20-2 determines that the error rate of received data exceeds a regulation value (Yes in step SR5), the inter-LSI transmission device 2 proceeds to a process in step SR7 illustrated in FIG. 7 and starts a process during a termination resistance adjustment period.

The process in the front half, enclosed within a frame of a one-dot chain line in the flowchart of FIG. 7, is the same as the process in the front half of the flowchart illustrated in FIG. 5 (the processes in steps ST5 through ST7 of the LSI 10-1 and the processes in steps SR6 through SR10 of the LSI 20-1).

In a termination resistance value adjustment period Pt2, firstly the LSIs 10-2 and 20-2 of the inter-LSI transmission device 2 perform the same processes as the LSIs 10-1 and 20-1 of the inter-LSI transmission device 1 (the processes in steps ST5 through ST7 of the LSI 10-2 and the processes in steps SR6 through SR10 of the LSI 20-2). Specifically, in the process during the termination resistance value adjustment period Pt2 of the inter-LSI transmission device 2, firstly the LSI 20-2 transmits a termination resistance adjust request issue request packet to the LSI 10-2. Then, in response to its termination resistance adjust request issue request packet, the LSI 10-2 returns a termination resistance adjust request to the LSI 20-2.

When the LSI 20-2 detects that the termination resistance adjust request has not failed (No in step ST7), the LSI 10-2 proceeds to a process in step ST21. The CRC check unit 170*b*-2 performs the same operation as a normal operation, as already explained in the first preferred embodiment.

When correctly receiving the termination resistance adjust request from the LSI 10-1 (No in step SR9), the LSI 20-2 proceeds to a process in step SR21.

In step ST21 the LSI 10-2 transmits a regulated number of NOPs (NOP packets) to the LSI 20-2. Then, when completing the transmission of the NOP packets to the LSI 20-2, the LSI 10-2 returns to its normal operation (step ST22).

When correctly receiving the termination resistance adjust request transmitted by the LSI 10-1 in step SR7, the LSI 20-2 starts an adjustment timer (step SR 21). This adjustment timer updates the resistance values of the termination resistors of the LSI 20-2 and measures the time of a period that lasts until it returns a normal operation. The adjustment timer is executed by a timer control unit 163*t*-2. After starting the adjustment timer in step SR21, the LSI 20-2 determines whether the adjustment timer has terminated (step SR22). Until determining in step SR22 that the adjustment timer has terminated, the LSI 20-2 repeats the process of step SR22. Then, after determining in step SR22 that the adjustment timer has terminated (Yes in step SR22), the LSI 20-2 returns to its normal operation (step SR23). Until the adjustment timer terminates after it starts, the LSI 20-2 performs no CRC error check as it does in the first preferred embodiment.

The second preferred embodiment is always controlled in such a way that a receiving side LSI (LSI 20-2 in this case) returns to its normal operation earlier than a transmitting side LSI (LSI 10-2 in this case). The length of a termination resistance adjustment period is determined taking into consideration the update processing time of termination resistors on a receiving side LSI, the data transfer speed of the transmission paths 4300 and 4400, and the like.

In the second preferred embodiment, either the transmission of a non-operation packet and an operation return request from a transmitting side LSI to a receiving side LSI or the transmission of a termination resistance value update complete packet from a receiving side LSI to a transmitting side LSI becomes unnecessary. Therefore, in the second preferred embodiment, packet communications (request and its response) between a transmitting side LSI and a receiving side LSI can be simplified more than in the first preferred embodiment.

Third Embodiment

In data transfer between LSIs, when received data fails, a receiving side LSI transmits a retransmit request to a transmitting side LSI. Upon receipt of the retransmit request from the receiving side LSI, the transmitting side LSI retransmits the failed data to the receiving side LSI. While waiting for retransmission data, the receiving side LSI discards subsequent data received from the transmitting side LSI. In the third preferred embodiment, the update of the resistance values of the termination resistors of its own LSI is performed while discarding the subsequent data. Specifically, in the third preferred embodiment, the update of the termination resistors of the receiving side LSI is performed during a period that lasts until failed data is received by the transmitting side LSI after the failed data retransmit request is transmitted to the transmitting side LSI (retransmission data receiving preparation period). In the third preferred embodiment, the update of the termination resistors of the transmitting side LSI is performed during a period that lasts until failed data is retransmitted to the receiving side LSI after the retransmit request is received from the receiving side LSI (retransmission data transmitting preparation period). Thus, in the third preferred embodiment, when a data reception error occurs in the receiving side LSI, not only the resistance values of the termination resistors of the receiving side LSI but the resistance values of the termination resistors of the transmitting side LSI are updated.

{System Configuration of the Third Embodiment}

Figure 8A:
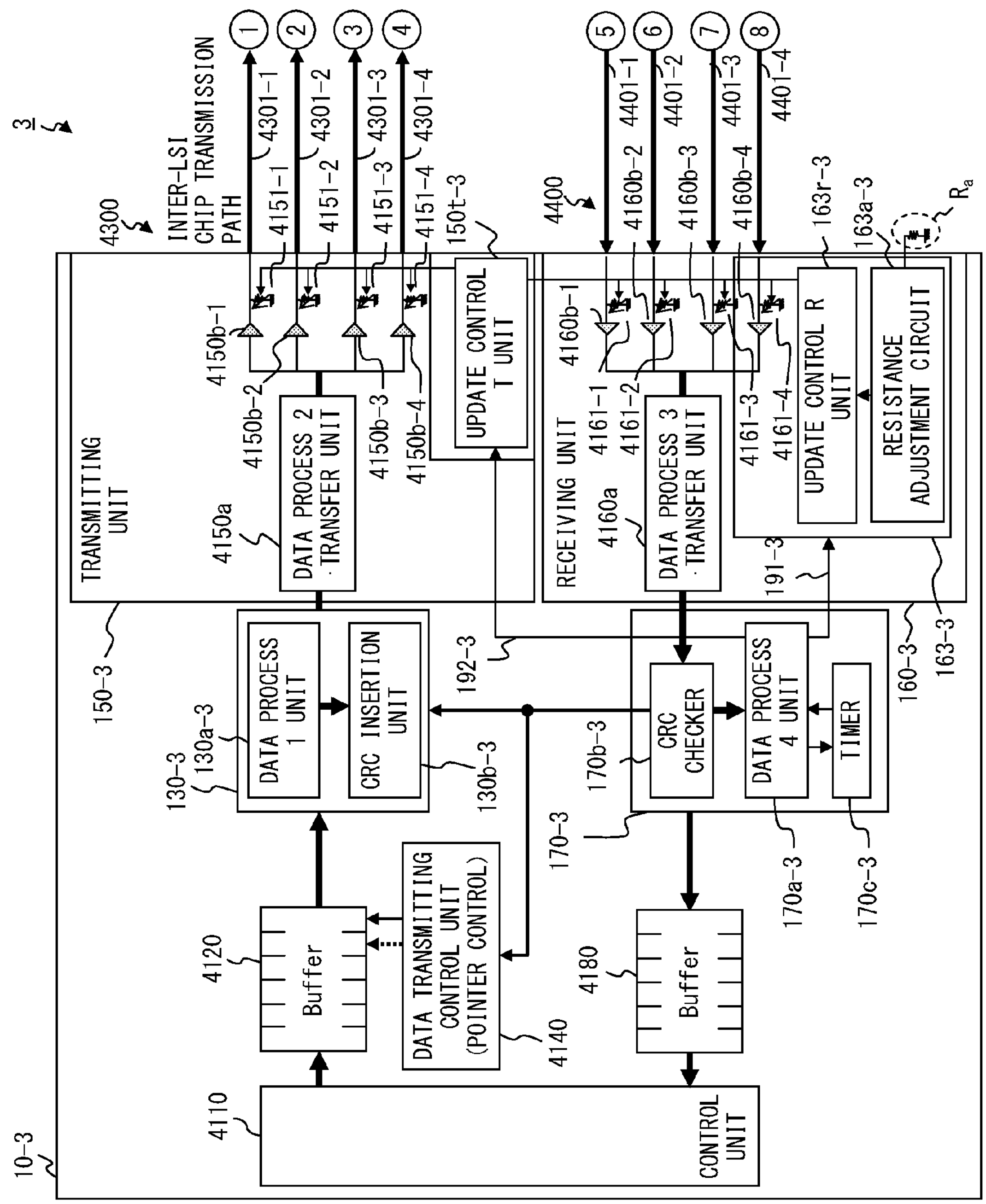

FIGS. 8A and 8B are the configuration the entirety of an inter-LSI transmission device 3 that is the third preferred embodiment. In FIGS. 8A and 8B, the same reference numerals are attached to the same components as the components provided for the inter-LSI transmission device 1 illustrated in FIGS. 1A and 1B.

In the inter-LSI transmission device 3, LSIs 10-3 and 20-3 correspond to the LSIs 4100 and 4200 of the inter-LSI transmission device 4000, respectively. The LSIs 10-3 and 20-3 can transmit/receive data to/from each other via the transmission paths 4300 and 4400. The inter-LSI transmission device 3 is one example of the detailed mounting of the present invention.

The inter-LSI transmission device 3 illustrated in FIGS. 8A and 8B includes a received packet processing unit 170-3 whose configuration/function are different from the received packet processing unit 170-1 provided for the inter-LSI transmission device 1. The received packet processing unit 170-3 includes a timer 170*c*-3 in addition to a data process 4 unit 170*a*-3 and a CRC checker 170*b*-3. The data process 4 unit 170*a*-3 is connected to a termination resistance adjustment circuit 163-3 in a receiving unit 160-3 by a signal wire 191-3. The data process 4 unit 170*a*-3 in the receiving unit 160-3 and a transmitting side update control T unit 150*t*-3 in a transmitting unit 150-3 are connected by a signal wire 192-3. This signal wire 192-3 is not always necessary. When the signal wire 192-3 is not provided for the LSI 10-3, it is OK if it is configured in such a way that the data process 4 unit 170*a*-3 can instruct the receiving side update control unit 163*r*-3 and a transmitting side update control T unit 150*t*-3 to update the resistance values of the termination resistors via a resistance adjustment circuit 163*a*-3.

The transmitting unit 150-3 includes the transmitting side update control T unit 150*t*-3. When receiving a termination resistance update instruction from the data process 4 unit 170*a*-3 via the signal wire 192-3, the transmitting side update control unit 150*t*-3 updates the termination resistors 4151-1 through 4151-4 in the transmitting unit 150-3 to the optimal values at the time.

The data process 4 unit 170*a*-3 has the following functions in addition to the functions provided for the data process 4 unit 170*a*-1. When the CRC checker 170*b*-3 detects the error of received data, the data process 4 unit 170*a*-3 requests that a transmitting packet processing unit 130-3 issue a retransmit request. After requesting that the transmitting packet processing unit 130-3 issue a retransmit request, the data process 4 unit 170*a*-3 also notifies an update control R unit 163*r*-3 of the update instruction of the termination resistors (termination resistance update instruction). Upon receipt of the retransmit request issue request from the data process 4 unit 170*a*-3, the data process 1 unit 130*a*-3 generates a retransmit request and transfers the request to the transmitting unit 150-3. The transmitting unit 150-3 transmits the retransmit request received from the data process 1 unit 130*a*-3 to the LSI 20-3 via the transmission path 4300.

The data process 4 unit 170*a*-3 notifies the transmitting side update control T unit 150*t*-3 of the termination resistance update instruction. The data process 4 unit 170*a*-3 instructs the transmitting packet processing unit 130-3 and the data transmitting control unit 4140 to retransmit a packet whose reception fails. On the other hand, the received packet processing unit 270-3 of the receiving side LSI 20-3 discards data other than retransmission data to be received while waiting for the reception of the data requested by the retransmit request (retransmission data). In the receiving side LSI 20-3, while received data is discarded, a data process 4 unit 270*a*-3 instructs an update control R unit 263*r*-3 to optimize the termination resistors. Simultaneously, the CRC checker 207*b*-3 of the receiving side LSI 20-3 nullifies CRC check while the timer 270*c*-3 measures time. So far an example of the case where the LSI 10-3 transmits a retransmit request to the LSI 20-3 has been explained. In other words, so far the configuration/operation in the case where the LSIs 10-3 and 20-3 are transmitting and receiving side LSIs, respectively, have been explained.

{Update Method of Termination Resistor}

Figure 9:
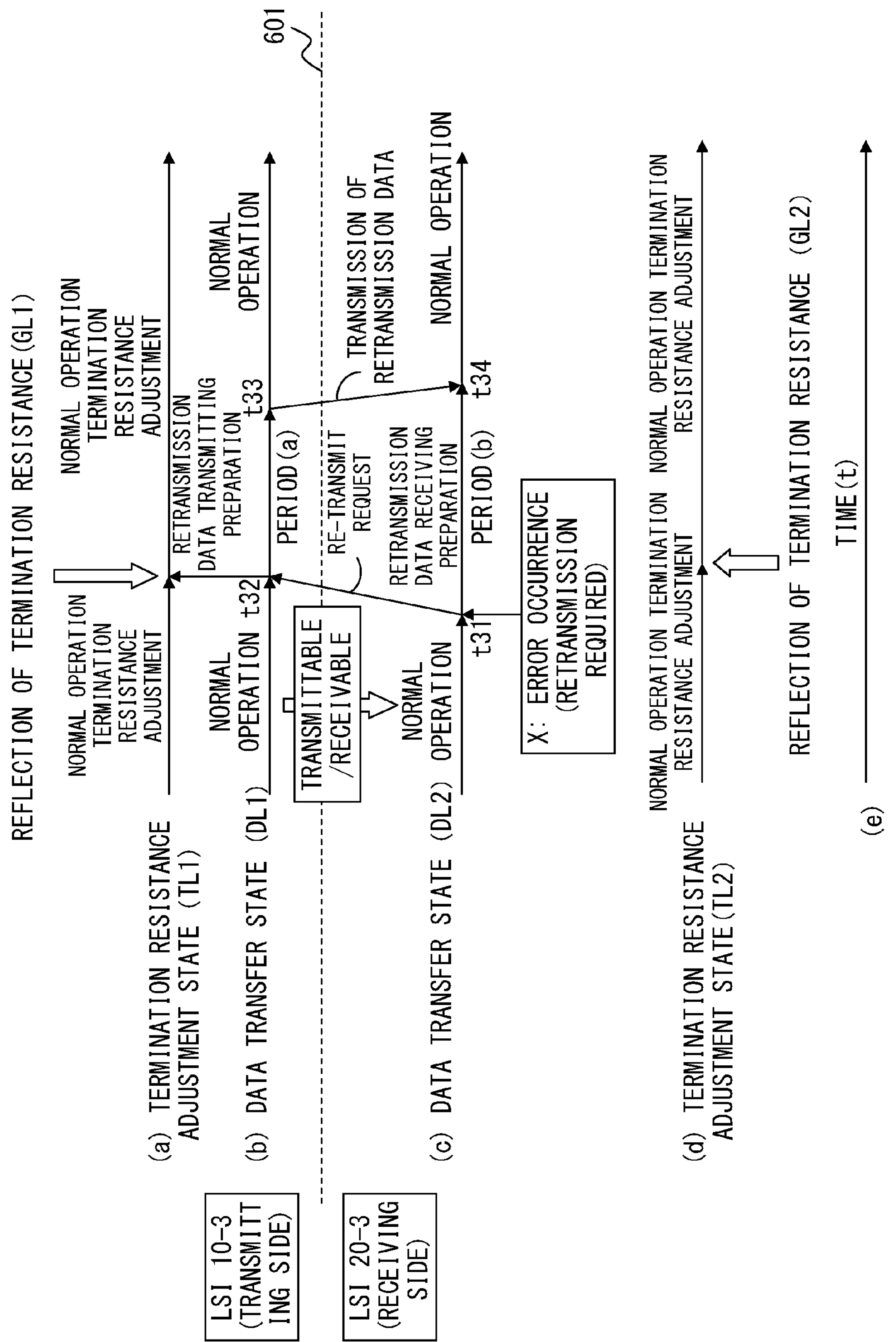
FIG. 9 illustrates how to update termination resistors in the third preferred embodiment.

FIG. 9 illustrates how to update termination resistors in the third preferred embodiment.

FIG. 9 is an example of the case where the LSIs 10-3 and 20-3 are transmitting and receiving side LSIs, respectively. The horizontal broken line at the center illustrated in FIG. 9 indicates the boundary between the LSIs 10-3 and 20-3. In FIG. 9, a state where communications between the LSIs 10-3 and 20-3 are conducted across this boundary is imaged.

In FIG. 9, a state (a) is the termination resistance adjustment state (TL1) of the LSI 10-3 and a state (b) is data transfer state (DL1) of the LSI 10-3. In FIG. 9 a state (c) is the data transfer state (DL2) of the LSI 20-3 and a state (d) is termination resistance adjustment state (TL2) of the LSI 20-3. In FIG. 9 a state (e) is a time axis (t). As the direction of the arrow of this time axis (t) indicates, time elapses from left to right in FIG. 9.

The LSIs 10-3 and 20-3 can transmit/receive packets to/from each other during a normal operation period (see the state (b) and (c) of FIG. 9).

Next, the update method of the termination resistor in the third preferred embodiment will be explained with reference to FIG. 9.

As illustrated in the state of FIG. 9, when detecting the CRC error of data received from the LSI 10-3 at a time t31, the LSI 20-3 requests that the LSI 10-3 retransmit the data. After requesting its retransmission, the LSI 20-3 transitions to a retransmission data preparation period (period (b) in the state (c) of FIG. 9). The LSI 10-3 receives the retransmit request transmitted by the LSI 20-3 at a time t32 (see the state (b) of FIG. 9). Upon receipt of the retransmit request from the LSI 20-3, the LSI 10-3 enters a retransmission data preparation period (period (a) in the state (b) of FIG. 9). The LSI 10-3 prepares for the retransmission of data, such as returning the history of transmission data up to the data whose retransmission is requested and the like within the retransmission data transmitting preparation period. After the completion of the retransmitting preparation, the LSI 10-3 transmits the retransmission data to the LSI 20-3 at a time t33 (see the state (b) of FIG. 9). Then, the LSI 10-3 returns to its normal operation period. On the other hand, after detecting the CRC error, the LSI 20-3 discards data received from the LSI 10-3 during a retransmission data receiving preparation period. Then, when receiving the retransmission data transmitted from the LSI 10-1 at a time t34 and confirming that the retransmission data is normal, the LSI 20-3 returns to its normal operation period (see the state (c) of FIG. 9).

In this case, the LSI 20-3 receives no useful data from the LSI 10-3 within the retransmission data receiving preparation period (period (b)). The LSI 10-3 also receives no useful data from the LSI 20-3 within the retransmission data transmitting preparation period (period (a)). The retransmission data receiving preparation period (period (b)) has an earlier starting time and a later ending time than the retransmission data transmitting preparation period (period (a)) (see the state (b) and (c) of FIG. 9). During the retransmission data receiving preparation period (period (b)), no valid data flows through the transmission paths 4300 and 4400. Therefore, during the retransmission data receiving preparation period (period (b)), the LSIs 10-3 and 20-3 can stop the error detection of received data. In the third preferred embodiment, using the retransmission data transmitting preparation period (period (a)) and the retransmission data receiving preparation period (period (b)), during which no valid data flows through the transmission paths 4300 and 4400, the resistance values of the termination resistors of the LSIs 10-3 and 20-3 are updated to the optimal values within these preparation periods.

However, within their normal operation period, the LSIs 10-3 and 20-3 adjust the optimal values of the termination resistors by the resistance adjustment circuits (resistance adjustment circuits 163*a*-3 and 263*a*-3) of the termination resistance adjustment circuits (termination resistance adjustment circuits 163-3 and 263-3). In the third preferred embodiment, the LSI 10-3, being a transmitting side LSI reflects the resistance values adjusted to the optimal values within their normal operation period in the termination resistors 4151-1 through 4151-4 during the retransmission data transmitting preparation period (period (a)) (see termination resistance reflection (GL1) in FIG. 9). The LSI 20-3, being a receiving side LSI, reflects the resistance values adjusted to the optimal values during their normal operation period in the termination resistors 4261-1 through 4261-4 during the retransmission data receiving preparation period (period (b)) (see termination resistance reflection (GL2) in FIG. 9).

Data re-transfer occurs when a data transfer state is not good. The resistance value of a termination resistor in a transmission path is one factor affecting the data transfer state. The third preferred embodiment takes into consideration the correlation between this data transfer state and the resistance value of a termination resistor and updates the termination resistors of both receiving and transmitting side LSIs. Specifically, the resistance values of the termination resistors of the transmitting and receiving side LSIs are updated (optimized to the resistance values) within the retransmission data transmitting preparation period (period (a)) and the retransmission data receiving preparation period (period (b)), respectively, using the error of received data as a trigger.

{Update Process Procedure of Termination Resistor}

Figure 10:
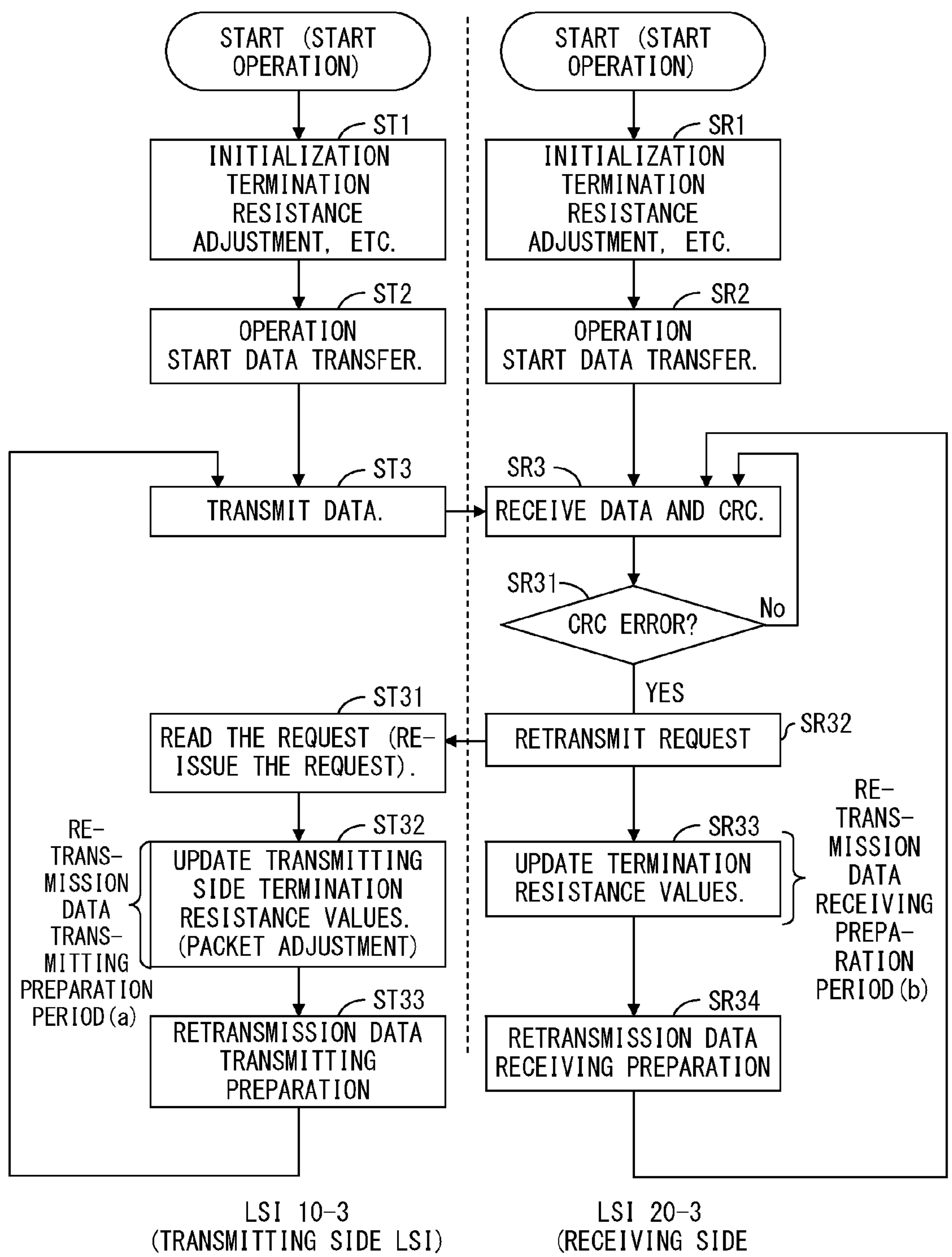
FIG. 10 is a flowchart illustrating the procedure of the update process of termination resistance in the third preferred embodiment.
Figure 1:
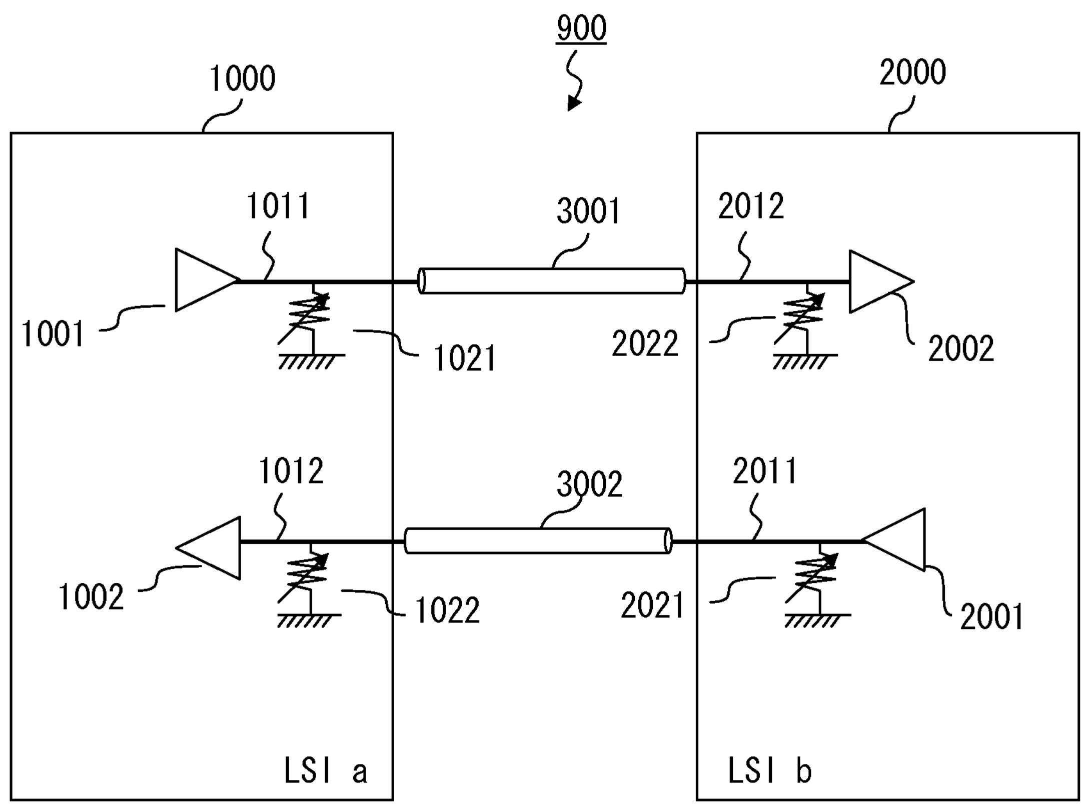

FIG. 10 is a flowchart illustrating the procedure of the update process of termination resistance in the third preferred embodiment.

FIG. 10 is an example of a case where the LSI 10-3 transmits data to the LSI 20-3. Specifically, it is an example of the data transfer in which transmitting and receiving side LSIs are the LSIs 10-3 and 20-3, respectively.

Firstly, the LSIs 10-3 and 20-3 perform the processes of steps ST1 and SR1, respectively. Thus, the LSIs 10-3 and

20-3 perform an initialization process, such as the adjustment of the resistance values of termination resistors (optimization of their resistance values) and the like. Then, the LSIs 10-3 and 20-3 perform the processes of steps ST2 and SR2, respectively. Thus, the LSIs 10-3 and 20-3 begin data transfer.

Then, the LSI 10-3 transmits data to the LSI 20-3 (step ST3). The LSI 20-3 receives the data transmitted by the LSI 10-3 and applies error check by CRC to the received data (step SR3). The LSI 20-3 determines whether there is a CRC error in the received data on the basis of the result of the above error check (step SR31). If it determines that the received data has no CRC error (No in step SR31), the LSI 20-3 returns to step SR3. If in step SR31 it determines that the received data has a CRC error (Yes in step SR31), the LSI 20-3 transmits a retransmit request to the LSI 10-3 (step SR32) and then sets the resistance values of the termination resistors of its own LSI to the optimal values at the time (step SR339). A control signal for setting these termination resistors of its own LSI (termination resistance setting signal) is generated by the resistance adjustment circuit 263*a*-3 of the termination resistance adjustment circuit 263-3. The update control unit 263*r*-3 sets the resistance values of the termination resistors 4261-1 through 4261-4 of the transmission path 4300 on to the optimal values at the time on the basis of the termination resistance setting signal generated by the resistance adjustment circuit 263*a*-3.

The LSI 20-3 prepares for the reception of retransmission data (step SR34). After completing the receiving preparation process of the retransmission data, the LSI 20-3 returns to step SR3. Thus, the LSI 20-3 returns to its normal operation.

Although the flowchart of FIG. 10 seems to depict that the process of step SR34 follows the process of step SR33, this is done for convenience' sake, and the processes of step SR33 and SR34 are performed in parallel. The timer 270*c*-3 measures the time of the termination resistance value update processing period in step SR33.

When receiving the packet for a retransmit request transmitted by the LSI 20-3 in step SR32, the LSI 10-3 reads the request for the packet. Then, the LSI 10-3 recognizes that it has received a retransmit request (step ST31). Then, the LSI 10-3 sets the resistance values of the termination resistors of its own LSI to the optimal values at the time (step ST32). A control signal for setting these termination resistors of its own LSI (termination resistance setting signal) is generated by the resistance adjustment circuit 163*a*-3 of the termination resistance adjustment circuit 163-3. The transmitting side update control T unit 150*t*-3 sets the resistance values of the termination resistors 4151-1 through 4151-4 of the transmission path 4300 to the optimal values at the time on the basis of the termination resistance setting signal generated by the resistance adjustment circuit 163*a*-3. When reading the request in step ST31 and determining that it is not a retransmit request, in step ST3 the LSI10-3 continues to normally transmit data.

The LSI 10-3 prepares for the transmission of retransmission data (step ST33). After completing the preparation for retransmission data, the LSI 10-3 returns to step ST3. Thus, the LSI 10-3 returns to its normal operation.

Thus, in the third preferred embodiment, the respective termination resistance of the receiving and transmitting side LDIs is updated to the optimal values at the time, using error detection in the received data of the receiving side LSI as a trigger.

The transmitting side LSI updates the termination resistance of its own LSI within the transmitting preparation period of retransmission data. The receiving side LSI updates the termination resistance of its own LSI within the receiving preparation period of retransmission data.

In the third preferred embodiment, as in the first preferred embodiment, the resistance values of the termination resistors can also be updated, using the fact that the error rate of received data exceeds a regulation value as a trigger.

According to this above-described preferred embodiment, the following effects can be obtained.

(1) Data currently being transferred between LSIs is never destroyed while updating (correcting) the resistance values of the termination resistors.

(2) Since the update process of the resistance values of the termination resistors interrupts the data transfer between LSIs for only a short time, there is hardly influence on the performance of a computer system. Since the resistance values of the termination resistors are updated while a computer system is not normally transferring data, there are no negative influences on the performance of the computer system.

(3) Since this preferred embodiment has a simple circuit configuration, the mounting of this preferred embodiment requires no complex circuitry. Therefore, this preferred embodiment can be easily mounted on an existing computer system.

(4) According to this preferred embodiment, the amount a termination resistor affects data transfer through a transmission path can be observed by comparing between the error occurrence states (for example, error rates) of received data in the case where the resistance value of a termination resistor is changed while invalid data is transferred through a transmission path and the case where the resistance value of the termination resistor is changed while normal data is transferred through the transmission path.

The present invention is not limited to the above-described preferred embodiments and can be variously transformed and applied as long as the spirit of the present invention is not deviated from. For example, the present invention is also applicable to a transmission device in which an active terminator that is an active termination circuit (termination unit) is installed at the last end of a transmission path, instead of a resistor that is a passive termination circuit. The active terminator includes, for example, a series resistor and a voltage regulator. The present invention is also not limited to the termination circuit of the transmission path of an inter-LSI transmission device and is also applicable to the adjustment of a termination circuit, such as an SCSI (small computer system interface bus) and the like. Furthermore, although any of the three above-described preferred embodiments has a configuration for updating the resistance values of the termination resistors on the transmitting and receiving side by a termination resistance adjustment circuit provided for a receiving unit, the resistance values of the termination resistors on the transmitting and receiving side may be updated by a termination resistance adjustment circuit individually provided for each side.

The advantages of each of the above-described preferred embodiments are as follows.

1. The resistance value of a termination resistor can be updated without affecting normal data received by a receiving circuit (receiving side LSI), that is, without causing an error in normal data received by a receiving circuit (receiving side LSI), during data transfer (First through Third Embodiments).

2. The receiving circuit (receiving side LSI) updates the resistance value of a termination resistor while receiving a non-operation packet (First Embodiment).

3. The receiving circuit (receiving side LSI) uses a timer in order to measure the time of a period for updating the resistance value of a termination resistor (termination unit adjustment period) (Second Embodiment).

4. During the termination unit adjustment period, the transmitting circuit (transmitting side LSI) transmits invalid packets (invalid data) to a transmission path while the receiving circuit (receiving side LSI) discards the invalid packets (invalid data) received from the transmitting circuit (transmitting side LSI) via a transmission path until it has detected a return packet (operation return request) (First Embodiment).

5. The resistance values of the respective termination resistors of the receiving circuit (receiving side LSI) and the transmitting circuit (transmitting side LSI) are updated using the retransmit request of the receiving circuit (receiving side LSI); specifically, the error occurrence in the received data of the receiving circuit (receiving side LSI) is a trigger. In this case, the transmitting circuit (transmitting side LSI) transmits no packets (non-operation packets (invalid packets)) to the receiving circuit (receiving side LSI) to adjust a period for the receiving circuit (receiving side LSI) to update the termination resistance of its termination resistors (termination unit adjustment period) (Third Embodiment). In this case, for example, the receiving circuit (receiving side LSI) measures the time of the termination unit adjustment period using a timer.

According to an aspect of the invention, the termination resistance can be corrected within data transfer without destroying data.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a demonstration of the superior and inferior aspects of the invention. Although the embodiments of the present invention have been described in detail, it should be understood that various changes, substitutions, and alterations could be made hereto without departing from the spirit and scope of the invention.

What is claimed is:

1. A transmission device including a transmitting circuit transmitting data to a transmission path and a receiving circuit receiving the data via the transmission path, the transmitting circuit comprising:

an error detection code generation unit that generates an error detection code for error detection of data to be transmitted to the receiving circuit;

a transmitting circuit side transmitting unit that transmits transmission data including the data and the error detection code to the transmission path; and a transmitting circuit side receiving unit that receives data from the receiving circuit, and the receiving circuit comprising:

a receiving side termination unit that terminates the transmission path at the receiving circuit side;

a receiving side adjusting unit that updates a resistance value of the receiving side termination unit to an appropriate value, the appropriate value being equal or similar to the resistance value of an external reference resistor;

a receiving circuit side receiving unit that receives the transmission data transmitted from the transmitting circuit via the transmission path;

an error detection unit that detects an error of data received by the receiving circuit side receiving unit;

a receiving circuit side transmitting unit that transmits a data retransmit request to request for retransmission of data for which the error is detected by the error detection unit to the transmitting circuit; and a receiving circuit side control unit that allows the receiving side adjusting unit to enter a resistance value adjustment period upon detecting the received data error by the error detection unit and that updates a resistance value of the receiving side termination unit to the appropriate value within the adjustment period by controlling the receiving side adjusting unit, wherein the transmitting circuit transmits invalid data to the transmission path within the resistance value adjustment period, and the receiving circuit discards the invalid data received from the transmitting circuit via the transmission path within the resistance value adjustment period.

2. The transmission device according to claim 1, wherein when the error detection unit detects an error in received data, the receiving circuit side transmitting unit generates and transmits an adjust request issue request that requests the transmitting circuit to issue an adjust request, and transmits a termination unit update complete packet to the transmitting circuit after update of a resistance value of the receiving side termination unit is completed;

when the receiving circuit receives the adjust request transmitted by the transmitting circuit in response to the adjust request issue request, the error detection unit checks an error of the adjust request and regards an error of a non-operation packet received from the transmitting circuit within the adjustment period by the receiving circuit side receiving unit invalid; and if there occurs an error in the adjust request, the receiving circuit side control unit requests that the transmitting circuit retransmit the adjust request using the receiving circuit side transmitting unit, and if there occurs no error in the adjust request, enables the device to enter the adjustment period, and the transmitting circuit further comprising:

a transmitting circuit side control unit to enable the transmitting circuit side transmitting unit to transmit an adjust request to the transmission path when the transmitting circuit side receiving unit receives the adjust request issue request from the receiving circuit side transmitting unit and to transmit invalid data to the transmission path, until a time at which the transmitting circuit side receiving unit receives an update complete notice from the receiving circuit.

3. The transmission device according to claim 1, wherein the receiving circuit further comprising:

a time measuring unit that measures a time of the adjustment period after the error detection unit detects an error of data received by the receiving circuit side receiving unit, wherein until the time measuring unit completes timing after the time measuring unit starts timing, the receiving circuit updates a resistance value of the receiving side termination unit using the receiving side termination unit adjustment unit, and the transmitting circuit side transmitting unit transmits a predetermined numbers of termination resistance non-operation packets to the transmission path.

4. The transmission device according to claim 3, wherein the transmitting circuit continues to transmit a termination resistance non-operation packet to the transmission path using the transmitting circuit side transmitting unit at least until the time measuring unit of the receiving circuit completes timing.

5. The transmission device according to claim 1, wherein the transmitting circuit further comprising:

a transmitting side termination unit that terminates of the transmission path at the transmitting circuit side; and a transmitting side termination unit adjustment unit that updates a resistance value of the transmitting side termination unit, wherein the transmitting side termination unit adjustment unit updates a resistance value of the transmitting side termination unit until the transmitting circuit side transmitting unit retransmits data whose retransmission is requested to the receiving circuit after the transmitting circuit side receiving unit receives the data retransmit request from the receiving circuit, and a receiving side termination unit adjustment unit updates a resistance value of the receiving side termination unit until the receiving circuit side receiving unit receives data whose retransmission is requested from the transmitting circuit after the receiving circuit side transmitting unit transmits the data retransmit request to the transmitting circuit.

6. A receiving circuit for receiving data transmitted to a transmission path by a transmitting circuit, via the transmission path, comprising:

a receiving side termination unit that terminates the transmission path at the receiving circuit side;

a receiving side adjustment unit that updates a resistance value of the receiving side termination unit to an appropriate value, the appropriate value being equal or similar to the resistance value of an external reference resistor;

a receiving circuit side receiving unit that receives the transmission data transmitted from the transmitting circuit via the transmission path;

an error detection unit that detects an error in data received by the receiving circuit side receiving unit;

a receiving circuit side transmitting unit that transmits a data retransmit request to request for retransmission of data for which the error is detected by the error detection unit to the transmitting circuit; and a receiving circuit control unit that allows the receiving side adjusting unit to enter a resistance value adjustment period upon detecting the received data error by the error detection unit and that updates a resistance value of the receiving side termination unit to the appropriate value within the termination unit adjustment period by controlling the receiving side adjusting unit, wherein the transmitting circuit transmits invalid data to the transmission path within the resistance value adjustment period, and the receiving circuit discards the invalid data received from the transmitting circuit via the transmission path within the resistance value adjustment period.

7. The receiving circuit according to claim 6, wherein when the error detection unit detects an error of received data, the receiving circuit side transmitting unit generates and transmits an adjust request issue request that requests the transmitting circuit to issue an adjust request, and transmits a termination unit update complete packet to the transmitting circuit after update of a resistance value of the receiving side termination unit is completed, and when the receiving circuit receives the adjust request transmitted by the transmitting circuit in response to the adjust request issue request, the error detection unit checks an error of the adjust request and regards an error of a non-operation packet received from the transmitting circuit within the adjustment period by the receiving circuit side receiving unit invalid; and if there occurs an error in the adjust request, the receiving circuit side control unit requests that the transmitting circuit retransmit the adjust request using the receiving circuit side transmitting unit, and if there occurs no error in the adjust request, enables the device to enter the adjustment period.

8. The receiving circuit according to claim 6, wherein the receiving circuit further comprising:

a time measuring unit that measures a time of the adjustment period after the error detection unit detects an error of data received by the receiving circuit side receiving unit, wherein until the time measuring unit completes timing after the time measuring unit starts timing, the receiving circuit updates a resistance value of the receiving side termination unit using the receiving side termination unit adjustment.

9. The receiving circuit according to claim 6, wherein a receiving side termination unit adjustment unit updates a resistance value of the receiving side termination unit until the receiving circuit side receiving unit receives data whose retransmission is requested from the transmitting circuit after the receiving circuit side transmitting unit transmits the data retransmit request to the transmitting circuit.

10. A control method of a transmission device including a transmitting circuit transmitting data to a transmission path and a receiving circuit receiving the data via the transmission path, wherein a method performed using the transmitting circuit comprises:

generating an error detection code for error detection of data to be transmitted to the receiving circuit;

transmitting transmission data including the data and the error detection code to the transmission path; and receiving data from the receiving circuit, and wherein a method performed using the receiving circuit comprises:

terminating the transmission path at the receiving circuit side;

updating a resistance value of the termination to an appropriate value, the appropriate value being equal or similar to the resistance value of an external reference resistor;

receiving the transmission data transmitted from the transmitting circuit via the transmission path;

detecting an error in the data received;

transmitting a data retransmit request to request for retransmission of data for which the error is detected by the detecting; and allowing the receiving circuit to enter a resistance value adjustment period upon detecting the received data error by the detecting and updating a resistance value of the terminating to the appropriate value within the adjustment period by controlling the receiving side adjusting unit, wherein the transmitting circuit transmits invalid data to the transmission path within the resistance value adjustment period, and the receiving circuit discards the invalid data received from the transmitting circuit via the transmission path within the resistance value adjustment period.

* * * * *